US011715976B2

(12) United States Patent
Chiyo et al.

(10) Patent No.: US 11,715,976 B2
(45) Date of Patent: Aug. 1, 2023

(54) COIL COMPONENT

(71) Applicant: TDK Corporation, Tokyo (JP)

(72) Inventors: Noritaka Chiyo, Tokyo (JP); Toshio Tomonari, Tokyo (JP); Shigeru Kaneko, Tokyo (JP); Shigenori Hirata, Tokyo (JP); Akihito Watanabe, Tokyo (JP); Hirohumi Asou, Tokyo (JP); Junpei Hayama, Tokyo (JP); Shigeki Ohtsuka, Tokyo (JP); Takahiro Ohishi, Tokyo (JP); Takaaki Imai, Tokyo (JP); Tomohiro Moriki, Tokyo (JP); Takakazu Maruyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 354 days.

(21) Appl. No.: 16/802,372

(22) Filed: Feb. 26, 2020

(65) Prior Publication Data

US 2020/0274392 A1    Aug. 27, 2020

(30) Foreign Application Priority Data

Feb. 27, 2019  (JP) .................................. 2019-034811

(51) Int. Cl.
*H02J 50/10* (2016.01)
*H04B 5/00* (2006.01)
(Continued)

(52) U.S. Cl.
CPC ................ *H02J 50/10* (2016.02); *H01F 5/04* (2013.01); *H01F 27/2828* (2013.01); *H04B 5/0037* (2013.01); *H04B 5/0081* (2013.01)

(58) Field of Classification Search
CPC .......... H02J 50/10; H02J 50/402; H02J 50/12; H01F 5/04; H01F 27/2828;
(Continued)

(56) References Cited

U.S. PATENT DOCUMENTS 6,377,145 B1 * 4/2002 Kumagai ................. H04R 7/16
335/274
2004/0256468 A1 * 12/2004 Akiho ................. G06K 7/10336
235/492
(Continued)

FOREIGN PATENT DOCUMENTS

EP     1 085 538 A1    3/2001
JP     H0737728 A  *   2/1995
(Continued)

OTHER PUBLICATIONS

Maxim, "Definition of Printed Circuit Board," 2014, pp. 1, (Year: 2014).*
(Continued)

*Primary Examiner* — Pinping Sun
(74) *Attorney, Agent, or Firm* — McDermott Will & Emery LLP

(57) ABSTRACT

Disclosed herein is a coil component that includes a first coil pattern wound in a planar spiral shape. At least one turn constituting the first coil pattern is divided into a plurality of lines by a spiral slit, and a space width between the plurality of lines differs depending on a planar position.

16 Claims, 25 Drawing Sheets

(51) Int. Cl.
*H01F 27/28* (2006.01)
*H01F 5/04* (2006.01)

(58) Field of Classification Search
CPC ............. H01F 2027/2809; H01F 5/003; H01F 27/255; H01F 27/2804; H01F 38/14; H01F 27/2871; H04B 5/0037; H04B 5/0081
See application file for complete search history.

(56) References Cited

U.S. PATENT DOCUMENTS

| | | | |
|---|---|---|---|
| 2005/0001031 A1 | 1/2005 | Akiho et al. | |
| 2010/0214187 A1* | 8/2010 | Sugita | G06K 19/07779 343/788 |
| 2011/0102125 A1* | 5/2011 | Tamura | H01F 27/34 336/232 |
| 2012/0223411 A1* | 9/2012 | Cho | H01L 27/0203 257/E29.325 |
| 2013/0015719 A1 | 1/2013 | Jung et al. | |
| 2013/0328165 A1* | 12/2013 | Harburg | H01F 41/046 336/221 |
| 2014/0125140 A1* | 5/2014 | Widmer | H02J 5/005 307/104 |
| 2014/0139307 A1* | 5/2014 | Kido | H01F 27/292 29/609 |
| 2014/0327394 A1* | 11/2014 | Asselin | H01F 38/14 320/108 |
| 2015/0028982 A1* | 1/2015 | Barry | H01F 27/00 336/200 |
| 2015/0130291 A1* | 5/2015 | Lim | H02J 5/005 336/200 |
| 2015/0170830 A1 | 6/2015 | Miyamoto | |
| 2016/0380469 A1* | 12/2016 | Lethellier | H02J 7/025 320/108 |
| 2017/0005519 A1* | 1/2017 | Lee | H02J 50/80 |
| 2017/0040690 A1 | 2/2017 | Peralta et al. | |
| 2018/0177075 A1 | 6/2018 | Kweon et al. | |
| 2018/0198310 A1* | 7/2018 | Hwang | H01F 27/36 |
| 2018/0241221 A1* | 8/2018 | McCauley | H02J 50/12 |
| 2018/0269716 A1* | 9/2018 | Jang | H02J 50/40 |
| 2018/0358168 A1 | 12/2018 | Furiya et al. | |
| 2018/0358174 A1 | 12/2018 | Komachi et al. | |
| 2019/0057942 A1* | 2/2019 | Male | H01L 23/49513 |
| 2020/0412175 A1* | 12/2020 | Han | H01F 27/36 |
| 2021/0012959 A1* | 1/2021 | Pei | H02J 50/10 |

FOREIGN PATENT DOCUMENTS

| | | |
|---|---|---|
| JP | H07272934 A * | 10/1995 |
| JP | H08-203739 A | 8/1996 |
| JP | 2003-197438 A | 7/2003 |
| JP | 4273734 B2 | 6/2009 |
| JP | 5686769 B2 | 3/2015 |
| JP | 2018-102124 A | 6/2018 |

OTHER PUBLICATIONS

Japanese Notice of Reasons for Refusal issued in corresponding Japanese Patent Application No. 2019-034811, dated Sep. 27, 2022, with English translation.

* cited by examiner

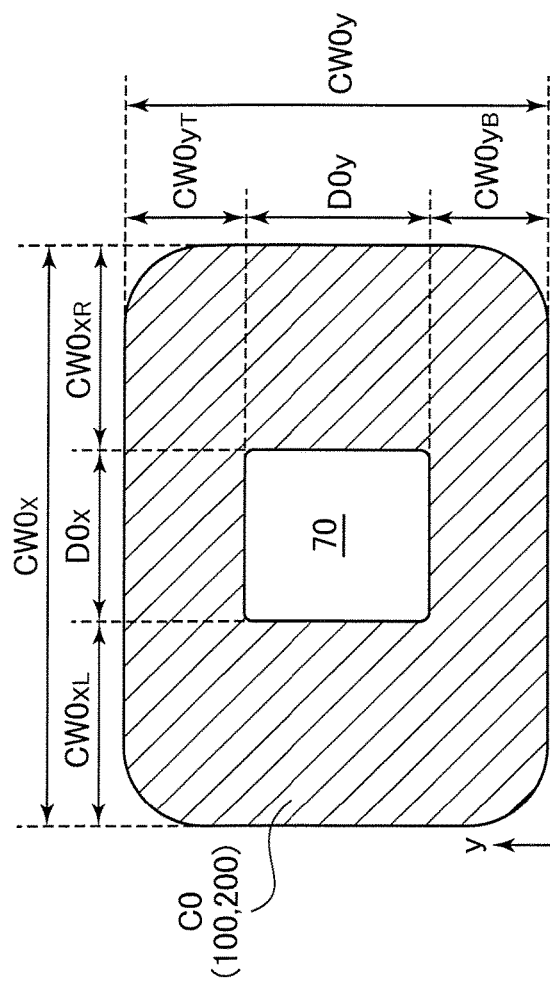
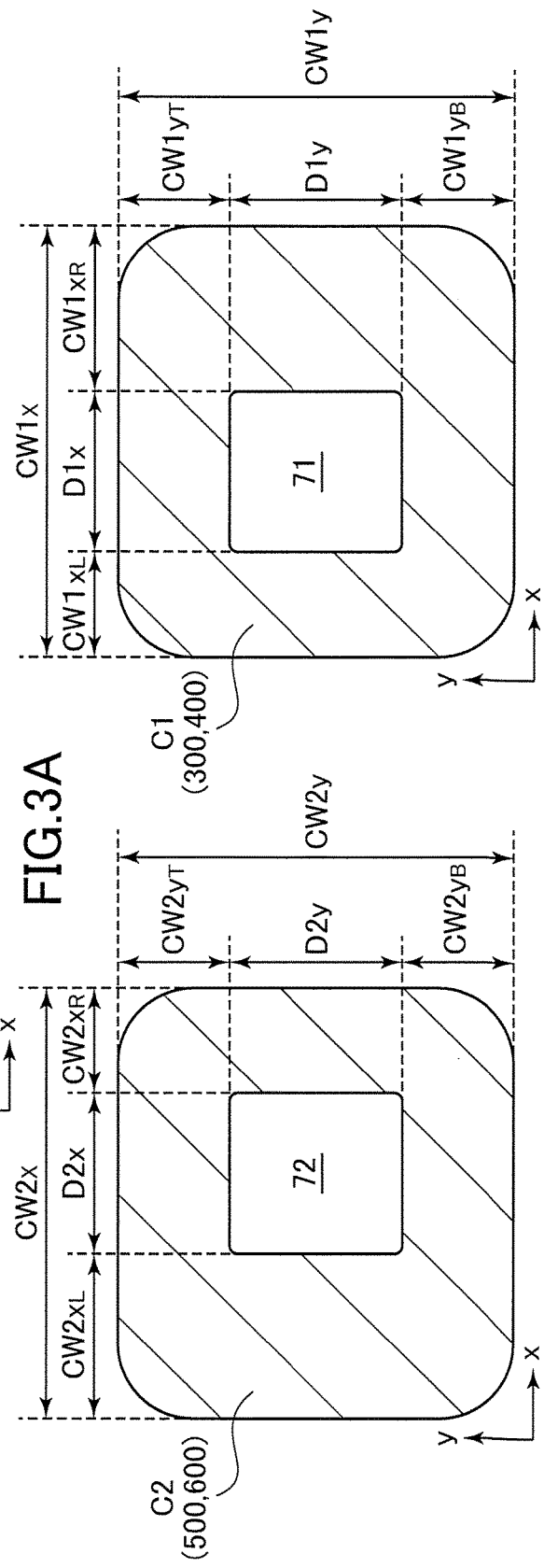
FIG.3A
FIG.3B
FIG.3C

COIL COMPONENT

BACKGROUND OF THE INVENTION

Field of the Invention

The present invention relates to a coil component and, more particularly, to a coil component suitable for use in wireless power transmission systems.

Description of Related Art

In recent years, wireless power transmission systems that feed electric power from a power transmitting side to a power receiving side by wireless are put in practical use. The wireless power transmission systems are expected to be applied to various products including transport equipment such as electric trains or electric cars, household appliances, electronic equipment, wireless communication devices, toys, and industrial equipment. For example, JP 2018-102124A and Japanese Patent No. 5,686,769 propose a wireless power transmission system provided with a plurality of power transmitting coils on the power transmitting side.

Although not related to the wireless power transmission systems, JP 1996-203739A and JP 2003-197438A disclose a coil component having a configuration in which a planar spiral conductor formed on the surface of an insulating substrate is radially divided by a spiral slit. When a planar conductor is thus radially divided by the spiral slit, uneven distribution of current density is reduced, allowing a reduction in DC resistance or AC resistance.

In the wireless power transmission systems, transmission efficiency significantly changes depending on the relative positional relationship between a power transmitting coil and a power receiving coil. Thus, it is difficult to ensure high transmission efficiency corresponding to the specification or shape of an application product only by simply using a plurality of power transmitting coils as in the wireless power transmission system described in JP 2018-102124A and Japanese Patent No. 5,686,769.

SUMMARY

It is therefore an object of the present invention to provide a coil component having a high degree of freedom of design to achieve high transmission efficiency corresponding to the specification or shape of an application product when the coil component is applied to a power transmitting coil of a wireless power transmission system.

A coil component according to the present invention has a first coil pattern wound in a planar spiral shape, wherein at least one turn constituting the first coil pattern is divided into a plurality of lines by a spiral slit, and a space width between the plurality of lines differs depending on a planar position.

According to the present invention, since at least one turn of the first coil pattern is divided into a plurality of lines, uneven distribution of current density is reduced, with the result that DC resistance or AC resistance can be reduced. In addition, since the space width between the plurality of lines differs depending on the planar position, the outer shape of the first coil pattern, the shape and position of an inner diameter area thereof can be easily finely adjusted by the design of the space width. Thus, there can be provided a coil component with a high degree of freedom of design, so that when the coil component according to the present invention is used as a power transmitting coil of a wireless power transmission system, it is possible to ensure high transmission efficiency in various application products having different specifications or shapes.

In the present invention, when a first virtual line extending in a first direction with a first reference point positioned in the inner diameter area of the first coil pattern as a starting point and a second virtual line extending in a second direction perpendicular to the first direction with the first reference point as a starting point are defined, a space width along the first virtual line and a space width along the second virtual line may differ from each other. Thus, it is possible to obtain a coil component having an outer shape of different vertical and horizontal sizes.

In this case, when a third virtual line extending in a direction 180° opposite to the first direction with the first reference point as a starting point and a fourth virtual line extending in a direction 180° opposite to the second direction with the first reference point as a starting point are defined, a space width along the first and third virtual lines may be larger than a space width along the second and fourth virtual lines, or a space width along the first virtual line may be larger than a space width along the second and third virtual lines. In the former case, there can be provided a coil component having an outer shape whose horizontal size is larger than the vertical size; in the latter case, there can be provided a coil component in which the position of the inner diameter position is off-centered.

In the latter configuration, the coil component according to the present invention may further have a second coil pattern wound in a planar spiral shape, wherein at least one turn constituting the second coil pattern may be divided into a plurality of lines by a spiral slit, and when a fourth virtual line extending in the first direction with a second reference point positioned in an inner diameter area of the second coil pattern as a starting point and a fifth virtual line extending in a direction 180° opposite to the first direction with the second reference point as a starting point are defined, a space width between the plurality of lines may be larger along the fifth virtual line than along the fourth virtual line, and the first and second coil patterns may be disposed such that the third and fourth virtual lines overlap each other. Thus, there can be provided a coil component including two coil patterns in each of which the position of the inner diameter area is off-centered.

The coil component according to the present invention may further include a second coil pattern wound in a planar spiral shape, the first coil pattern may be formed on one surface of a first insulating substrate, the second coil pattern may be formed on the other surface of the first insulating substrate, the innermost turn of the first coil pattern may be divided by a spiral slit into a plurality of lines including first and second lines, the innermost turn of the second coil pattern may be divided by a spiral slit into a plurality of lines including third and fourth lines, the first line may be positioned on the inner peripheral side with respect to the second line, the third line may be positioned on the inner peripheral side with respect to the fourth line, the inner peripheral ends of the first and fourth lines may be connected to each other through a first through hole conductor penetrating the first insulating substrate, and the inner peripheral ends of the second and third lines may be connected to each other through a second through hole conductor penetrating the first insulating substrate. Thus, the radial position of each line alternates between the first and second coil patterns, whereby a difference in the electrical length of the line between inner and outer peripheral sides can be reduced.

The coil component according to the present invention may further have a third coil pattern wound in a planar spiral shape, at least one turn constituting the third coil pattern may be divided into a plurality of lines by a spiral slit, and when a fifth virtual line extending in the first direction with the second reference point positioned in an inner diameter area of the third coil pattern as a starting point and a sixth virtual line extending in the third direction with the second reference point as a starting point are defined, a space width between the plurality of lines may be larger along the fifth virtual line than along the sixth virtual line, and the first and third coil patterns may overlap each other such that the sixth virtual line passes the inner diameter area of the first coil pattern in a plan view. Thus, when the coil component according to the present invention is used as a power transmitting coil of a wireless power transmission system, it is possible to suppress a reduction in transmission efficiency even when a power receiving coil is positioned between the first and third coil patterns in a plan view.

The coil component according to the present invention may further has a switch that exclusively supply current to one of the first and third coil patterns. Thus, when the coil component according to the present invention is used as a power transmitting coil of a wireless power transmission system, it is possible to select the first or third coil pattern to be used for power transmission in accordance with the planar position of a power receiving coil.

The coil component according to the present invention may further include a fourth coil pattern wound in a planar spiral shape, the third coil pattern may be formed on one surface of a second insulating substrate, the fourth coil pattern may be formed on the other surface of the second insulating substrate, the innermost turn of the third coil pattern may be divided by a spiral slit into a plurality of lines including fifth and sixth lines, the innermost turn of the fourth coil pattern may be divided by a spiral slit into a plurality of lines including seventh and eighth lines, the fifth line may be positioned on the inner peripheral side with respect to the sixth line, the seventh line may be positioned on the inner peripheral side with respect to the eighth line, the inner peripheral ends of the fifth and eighth lines may be connected to each other through a third through hole conductor penetrating the second insulating substrate, and the inner peripheral ends of the sixth and seventh lines may be connected to each other through a fourth through hole conductor penetrating the second insulating substrate. Thus, the radial position of each line alternates between the third and fourth coil patterns, whereby a difference in the electrical length of the line between inner and outer peripheral sides can be reduced.

The coil component according to the present invention may further have a fifth coil pattern wound in a planar spiral shape, at least one turn constituting the fifth coil pattern may be divided into a plurality of lines by a spiral slit, and when a seventh virtual line extending in the first direction with a third reference point positioned in an inner diameter area of the fifth coil pattern as a starting point and an eighth virtual line extending in the third direction with the third reference point as a starting point are defined, a space width between the plurality of lines may be larger along the eighth virtual line than along the seventh virtual line, and the first and fifth coil patterns may overlap each other such that the seventh virtual line passes the inner diameter area of the first coil pattern in a plan view. Thus, when the coil component according to the present invention is used as a power transmitting coil of a wireless power transmission system, it is possible to suppress a reduction in transmission efficiency even when a power receiving coil is positioned between the first and third coil patterns or between the first and fifth coil patterns in a plan view.

In this case, the third and fifth coil patterns may be formed on the same insulating substrate. This allows the relative position between the third and fifth coil patterns to be fixed.

In the present invention, the first coil pattern may have an innermost turn positioned on the innermost peripheral side, an outermost turn positioned on the outermost peripheral side, and an intermediate turn whose turn number counting from the innermost or outermost turn is at the center of the total number of turns, the innermost turn, outermost turn, and intermediate turn may each be divided by a spiral slit into a plurality of lines, and the line width of each of the plurality of lines constituting each of the inner and outermost turns may be smaller than the line width of each of the plurality of lines constituting the intermediate turn. Since the line width of the innermost turn and that of the outermost turn are small, a loss caused due to the influence of a magnetic field can be reduced.

In this case, the line width of each of the plurality of lines constituting the innermost turn may be smaller than the line width of each of the plurality of lines constituting the outermost turn, and this makes it possible to reduce the loss at the innermost turn to be exposed to a strongest magnetic field.

The coil component according to the present invention may further have a sixth coil pattern wound in a planar spiral shape and a magnetic sheet, the first and sixth coil patterns may be disposed so as to overlap the magnetic sheet in a plan view, the first and sixth coil patterns may be connected in parallel, the first coil pattern is disposed closer to the magnetic sheet than the sixth coil pattern, a line length of the sixth coil pattern may be larger than that of the first coil pattern. Since a difference is provided between the line lengths of the first and sixth coil patterns, impedance of each coil pattern can be finely adjusted. This allows a difference in impedance between the first and sixth coil patterns can be reduced, so that the impedance difference in the entire coil component can be reduced. As a result, a loss caused due to the impedance difference can be reduced.

As described above, according to the present invention, there can be provided a coil component having a high degree of freedom of design. Thus, when the coil component of the present invention is applied to a power transmitting coil of a wireless power transmission system, high transmission efficiency corresponding to the specification or shape of an application product can be ensured.

BRIEF DESCRIPTION OF THE DRAWINGS

The above features and advantages of the present invention will be more apparent from the following description of certain preferred embodiments taken in conjunction with the accompanying drawings, in which:

FIGS. 3A to 3C are schematic plan views for explaining the planar shapes of the center coil, first side coil, and second side coil, respectively.

DETAILED DESCRIPTION OF THE EMBODIMENTS

Preferred embodiments of the present invention will be explained below in detail with reference to the accompanying drawings.

Figure 1:
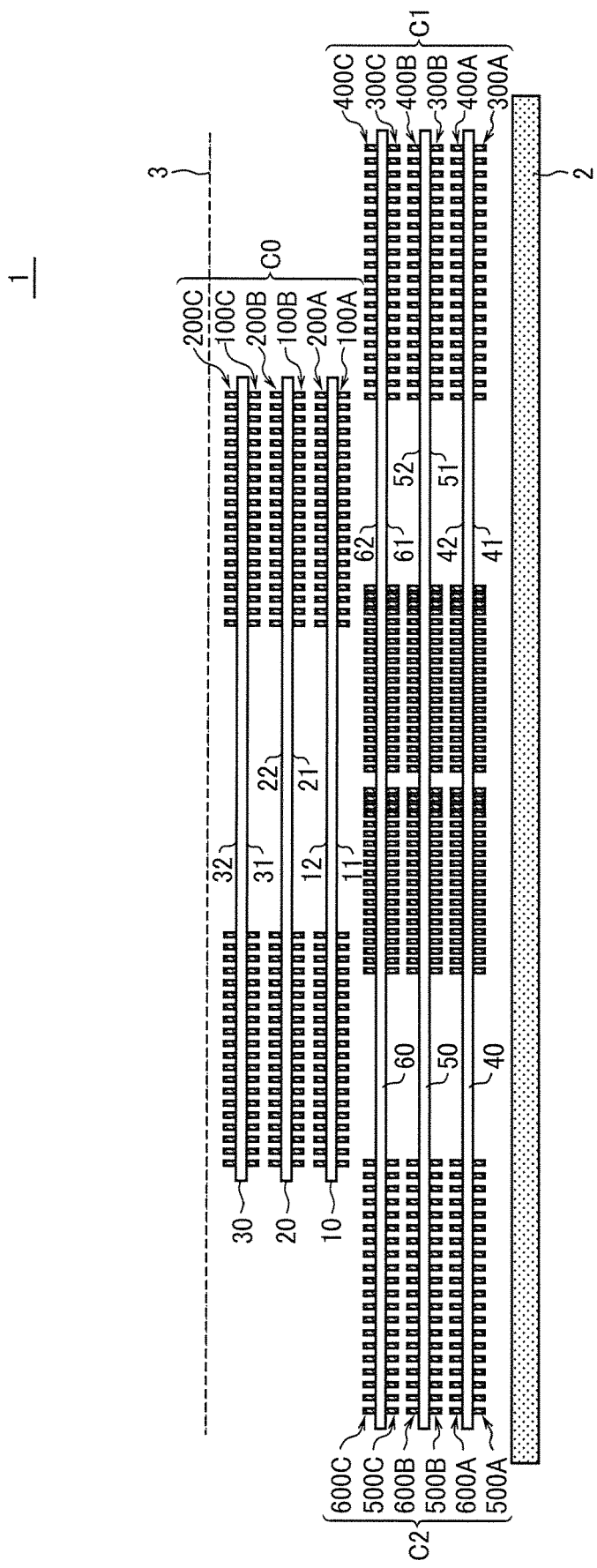
FIG. 1 is a schematic cross-sectional view for explaining the configuration of a coil component according to a preferred embodiment of the present invention.

FIG. 1 is a schematic cross-sectional view for explaining the configuration of a coil component 1 according to a preferred embodiment of the present invention.

As illustrated in FIG. 1, the coil component 1 according to the present embodiment includes a magnetic sheet 2, a center coil C0, a first side coil C1, and a second side coil C2 each of which is disposed so as to overlap the magnetic sheet 2.

The magnetic sheet 2 is a sheet member made of as high permeability material such as ferrite, permalloy, or a composite magnetic material and functions as a magnetic path for magnetic flux that interlinks with the center coil C0 and side coils C1, C2. Although not particularly limited, the coil component 1 according to the present embodiment can be used as a power transmitting coil of a wireless power transmission system. In this case, a power receiving coil is disposed on a power receiving surface 3 positioned on the side opposite to the magnetic sheet 2 with respect to the center coil C0 and side coils C1, C2.

The center coil C0 has coil patterns 100A, 100B, and 100C formed respectively on one surfaces 11, 21, and 31 of substrates 10, 20, and 30 and coil patterns 200A, 200B, and 200C formed respectively on the other surfaces 12, 22, and 32 of substrates 10, 20, and 30. The first side coil C1 has coil patterns 300A, 300B, and 300C formed respectively on one surfaces 41, 51, and 61 of substrates 40, 50, and 60, and coil patterns 400A, 400B, and 400C formed respectively on the other surfaces 42, 52, and 62 of substrates 40, 50, and 60. The second side coil C2 has coil patterns 500A, 500B, and 500C formed respectively on one surfaces 41, 51, and 61 of substrates 40, 50, and 60, and coil patterns 600A, 600B, and 600C formed respectively on the other surfaces 42, 52, and 62 of substrates 40, 50, and 60. Although there is no particular restriction on the material of the substrates 10, 20, 30, 40, 50, and 60, a film-shaped transparent or semi-transparent flexible material, such as PET resin, having a thickness of about 10 μm to 50 μm can be used. Further, the substrates 10, 20, 30, 40, 50, and 60 may each be a flexible substrate obtained by impregnating glass cloth with epoxy-based resin.

In the present embodiment, the coil patterns (100A, 100B, 100C, 200A, 200B, and 200C) constituting the center coil C0 are the same in the number of turns, the coil patterns (300A, 300B, 300C, 400A, 400B, and 400C) constituting the first side coil C1 are the same in the number of turns, and the coil patterns (500A, 500B, 500C, 600A, 600B, and 600C) constituting the second side coil C2 are the same in the number of turns. Further, the coil patterns constituting the first side coil C1 and the coil patterns constituting the second side coil C2 are also the same in the number of turns. The coil patterns constituting the center coil C0 and the coil patterns constituting the first side coil C1 or second side coil C2 may be the same or different in the number of turns. Hereinafter, when there is no particular need to make a distinction between the coil patterns 100A, 100B, and 100C, or when the coil patterns 100A, 100B, and 100C are collectively referred to, they are sometimes simply referred to as "coil pattern 100". The same applies to the other coil patterns 200, 300, 400, 500, and 600.

Figure 2:
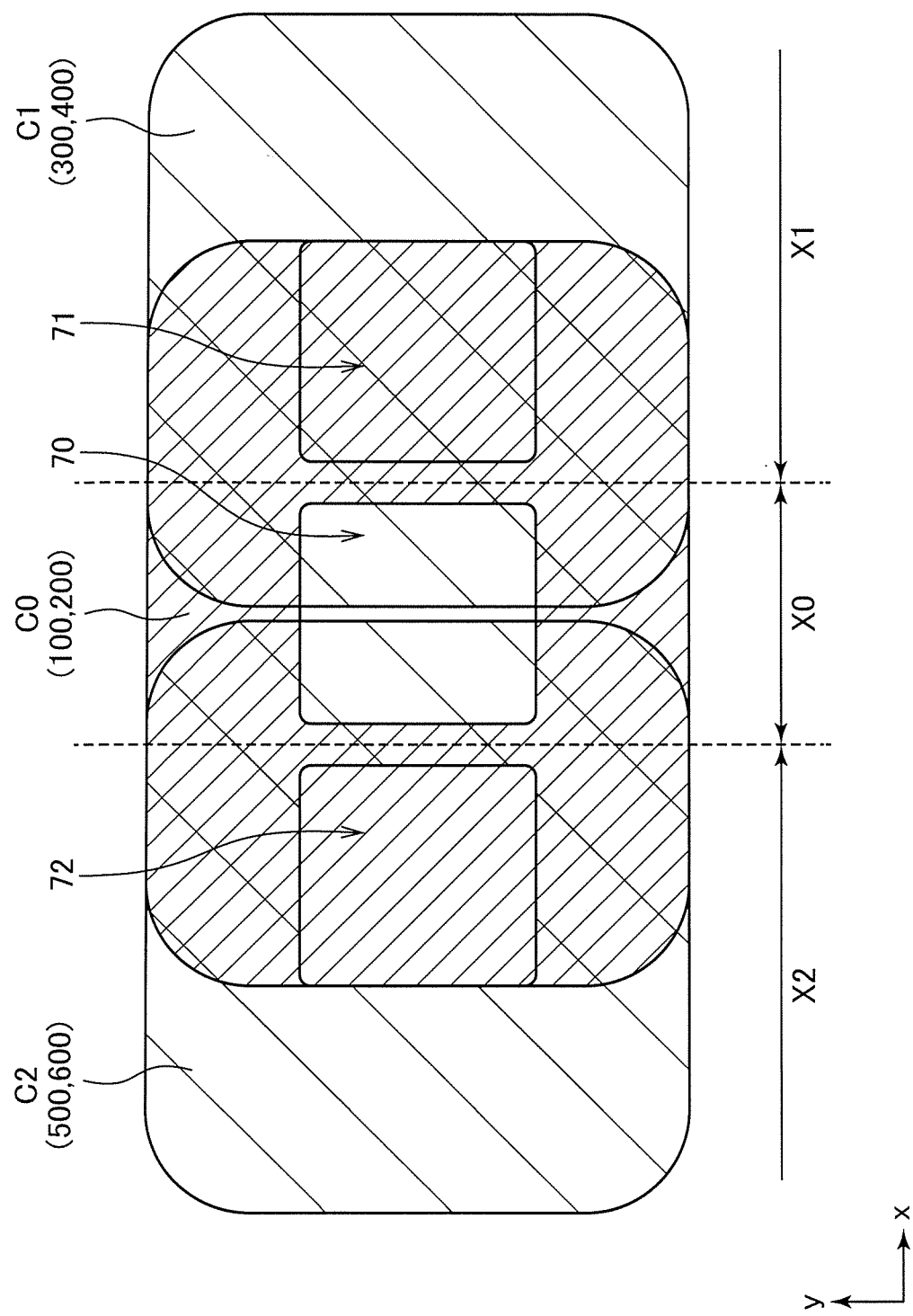
FIG. 2 is a plan view transparently illustrating the coil component shown in FIG. 1.

FIG. 2 is a plan view transparently illustrating the coil component 1 according to the present embodiment.

In FIG. 2, the hatched areas are each a coil area including the entire coil pattern from its innermost turn to outermost turn, i.e., an area including the entire coil pattern excluding the inner diameter area of the coil pattern. The specific pattern shape within the coil area will be described later.

As illustrated in FIG. 2, a part of the coil area of the center coil C0 has an overlap with the coil area of the first side coil C1 in a plan view, and another part of the coil area of the center coil C0 has an overlap with the coil area of the second side coil C2 in a plan view. The coil area of the first side coil C1 and the coil area of the second side coil C2 do not have an overlap. The coil area of the first side coil C1 and the coil area of the second side coil C2 have shapes symmetric with respect to the center line of the center coil C0 in the x-direction and are disposed symmetrically with respect thereto. In the present embodiment, the coil areas of the respective center coil C0, first side coil C1, and second side coil C2 have the same width in the y-direction.

The center coil C0, first side coil C1, and second side coil C2 have their respective inner diameter areas 70 to 72. The inner diameter area refers to an area surrounded by the coil pattern, where there is no conductor pattern. As illustrated in FIG. 2, in the present embodiment, a part of the inner diameter area 70 of the center coil C0 overlaps the coil area of the first side coil C1, and another part of the inner diameter area 70 of the center coil C0 overlaps the coil area of the second side coil C2. Further, the inner diameter area 71 of the first side coil C1 completely overlaps the coil area of the center coil C0, and the inner diameter area 72 of the second side coil C2 completely overlaps the coil area of the center coil C0.

As described above, the three coils C0 to C2 constituting the coil component 1 according to the present embodiment are disposed such that the x-direction positions thereof differ from one another, so that when the coil component 1 is used as a power transmitting coil of a wireless power transmission system, a power feedable area is enlarged in the x-direction. For example, the following configuration is possible: the center coil C0 is used to perform power feeding when a power receiving coil exists in the area X0 of FIG. 2; the first side coil C1 is used to perform power feeding when a power receiving coil exists in the area X1; and the second side coil C2 is used to perform power feeding when a power receiving coil exists in the area X2. The boundary between the areas X0 and X1 may be set between the inner diameter areas 70 and 71, and the boundary between the areas X0 and X2 may be set between the inner diameter areas 70 and 72.

FIGS. 3A to 3C are schematic plan views for explaining the planar shapes of the center coil C0, first side coil C1, and second side coil C2, respectively.

As illustrated in FIG. 3A, the center coil C0 is substantially rectangular in outer shape in which a size $CW0x$ in the x-direction is larger than a size $CW0y$ in the y-direction. That is, $CW0x>CW0y$ is satisfied.

On the other hand, in the inner shape of the center coil C0, i.e., in the shape of the inner diameter area 70, a size $D0x$ in the x-direction and a size $D0y$ in the y-direction are substantially the same. That is, $D0x \cong D0y$ is satisfied. In other words, $CW0x/CW0y>D0x/D0y$ is satisfied, which means that the inner shape is closer to a square than the outer shape. The inner shape of the center coil C0 may be a square.

Assuming that, of the coil area of the center coil C0, an area positioned in the positive x-direction with respect to the inner diameter area 70, i.e., an area positioned at the 3 o'clock position with respect to the inner diameter area 70 has an x-direction width $CW0x_R$ and that an area positioned in the negative x-direction with respect to the inner diameter area 70, i.e., an area positioned at the 9 o'clock position with respect to the inner diameter area 70 has an x-direction width $CW0x_L$, $CW0x_R=CW0x_L$ is satisfied. That is, the inner diameter area 70 is not decentered in the x-direction. Similarly, assuming that, of the coil area of the center coil C0, an area positioned in the positive y-direction with respect to the inner diameter area 70, i.e., an area positioned at the 12 o'clock position with respect to the inner diameter area 70 has a y-direction width $CW0y_T$ and that an area positioned in the negative y-direction with respect to the inner diameter area 70, i.e., an area positioned at the 6 o'clock position with respect to the inner diameter area 70 has a y-direction width $CW0y_B$, $CW0y_T=CW0y_B$ is satisfied. That is, the inner diameter area 70 is also not decentered in the y-direction. Further, in the center coil C0, $CW0x_R=CW0x_L>CW0y_T=CW0y_B$ is satisfied.

As illustrated in FIG. 3B, the first side coil C1 is substantially rectangular in outer shape in which a size $CW1x$ in the x-direction is larger than a size $CW1y$ in the y-direction. That is, $CW1x>CW1y$ is satisfied.

On the other hand, in the inner shape of the first side coil C1, i.e., in the shape of the inner diameter area 71, a size $D1x$ in the x-direction and a size $D1y$ in the y-direction are substantially the same. That is, $D1x \cong D1y$ is satisfied. In other words, $CW1x/CW1y>D1x/D1y$ is satisfied, which means that the inner shape is closer to a square than the outer shape. The inner shape of the first side coil C1 may be a square.

Assuming that, of the coil area of the first side coil C1, an area positioned in the positive x-direction with respect to the inner diameter area 71, i.e., an area positioned at the 3 o'clock position with respect to the inner diameter area 71 has an x-direction width $CW1x_R$ and that an area positioned in the negative x-direction with respect to the inner diameter area 71, i.e., an area positioned at the 9 o'clock position with respect to the inner diameter area 71 has an x-direction width $CW1x_L$, $CW1x_R>CW1x_L$, is satisfied. That is, the inner diameter area 71 is decentered in the negative x-direction (leftward). On the other hand, assuming that, of the coil area of the first side coil C1, an area positioned in the positive y-direction with respect to the inner diameter area 71, i.e., an area positioned at the 12 o'clock position with respect to the inner diameter area 71 has a y-direction width $CW1y_T$ and that an area positioned in the negative y-direction with respect to the inner diameter area 71, i.e., an area positioned at the 6 o'clock position with respect to the inner diameter area 71 has a y-direction width $CW1y_B$, $CW1y_T=CW1y_B$ is satisfied. That is, the inner diameter area 71 is also not decentered in the y-direction. Further, in the first side coil C1, $CW1x_L=CW1y_T=CW1y_B$ may be satisfied.

As illustrated in FIG. 3C, the second side coil C2 is substantially rectangular in outer shape in which a size $CW2x$ in the x-direction is larger than a size $CW2y$ in the y-direction. That is, $CW2x>CW2y$ is satisfied.

On the other hand, in the inner shape of the second side coil C2, i.e., in the shape of the inner diameter area 72, a size $D2x$ in the x-direction and a size $D2y$ in the y-direction are substantially the same. That is, $D2x \cong D2y$ is satisfied. In other words, $CW2x/CW2y>D2x/D2y$ is satisfied, which means that the inner shape is closer to a square than the outer shape. The inner shape of the second side coil C2 may be a square.

Assuming that, of the coil area of the second side coil C2, an area positioned in the positive x-direction with respect to the inner diameter area 72, i.e., an area positioned at the 3 o'clock position with respect to the inner diameter area 72 has an x-direction width $CW2x_R$ and that an area positioned in the negative x-direction with respect to the inner diameter area 72, i.e., an area positioned at the 9 o'clock position with respect to the inner diameter area 72 has an x-direction width $CW2x_L$, $CW2x_R>CW2x_L$ is satisfied. That is, the inner diameter area 72 is decentered in the positive x-direction (rightward). On the other hand, assuming that, of the coil area of the second side coil C2, an area positioned in the positive y-direction with respect to the inner diameter area 72, i.e., an area positioned at the 12 o'clock position with respect to the inner diameter area 72 has a y-direction width $CW2y_T$ and that an area positioned in the negative y-direction with respect to the inner diameter area 72, i.e., an area positioned at the 6 o'clock position with respect to the inner diameter area 72 has a y-direction width $CW2y_B$, $CW2y_T=CW2y_B$ is satisfied. That is, the inner diameter area 72 is also not decentered in the y-direction. Further, in the second side coil C2, $CW2x_R=CW2y_T=CW2y_B$ may be satisfied.

The y-direction size D0y of the inner diameter area 70 may be equal to the y-direction sizes D1y and D2y of the respective inner diameter areas 71 and 72. That is, D0y=D1y=D2y may be satisfied. On the other hand, the x-direction size D0x of the inner diameter area 70 may be larger than the x-direction sizes D1x and D2x of the respective inner diameter areas 71 and 72. That D0x>D1x=D2x may be satisfied.

As described above, in the present embodiment, the center coil C0 has a substantially rectangular outer shape elongated in the x-direction, the inner diameter area 71 of the first side coil C1 positioned in the positive x-direction (rightward) with respect to the center coil C0 is decentered in the negative x-direction (leftward), and the inner diameter area 72 of the second side coil C2 positioned in the negative x-direction (leftward) with respect to the center coil C0 is decentered in the positive x-direction (rightward). Thus, when the coil component 1 according to the present embodiment is used as a power transmitting coil of a wireless power transmission system, the following advantage can be obtained: even when the planar position of a power receiving coil deviates from the center coil C0 to lower the efficiency of transmission using the center coil C0, efficient power transmission can be ensured by the first side coil C1 or second side coil C2.

Figure 4:
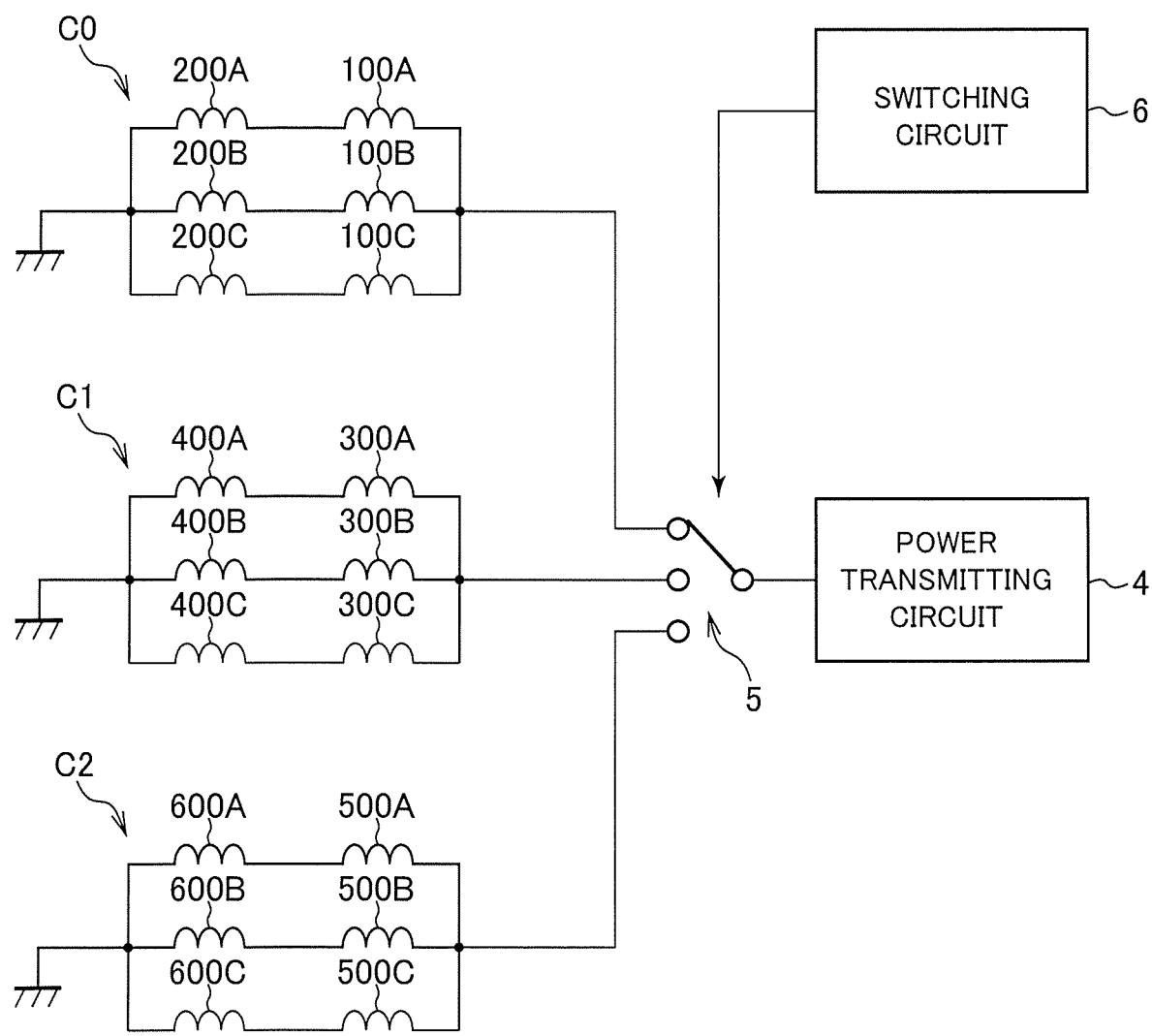
FIG. 4 is a circuit diagram of the coil component shown in FIG. 1.

FIG. 4 is a circuit diagram of the coil component 1 according to the present embodiment.

As illustrated in FIG. 4, the center coil C0 has a configuration in which serially connected coil patterns 100A, 200A, serially connected coil patterns 100B, 200B, and serially connected coil patterns 100C, 200C are connected in parallel. Similarly, the first side coil C1 has a configuration in which serially connected coil patterns 300A, 400A, serially connected coil patterns 300B, 400B, and serially connected coil patterns 300C, 400C are connected in parallel. The second side coil C2 has a configuration in which serially connected coil patterns 500A, 600A, serially connected coil patterns 500B, 600B, and serially connected coil patterns 500C, 600C are connected in parallel.

When the coil component 1 according to the present embodiment is used as a power transmitting coil of a wireless power transmission system, one of the center coil C0, side coil C1, and side coil C2 is connected to a power transmitting circuit 4 through a switch 5. The switch 5 is a circuit exclusively connecting the power transmitting circuit 4 and one of the coils C0, C1, and C2, and the switching of connection is controlled by a switching circuit 6. Thus, current output from the power transmitting circuit 4 is supplied to one of the coils C0, C1, and C2.

Figure 5:
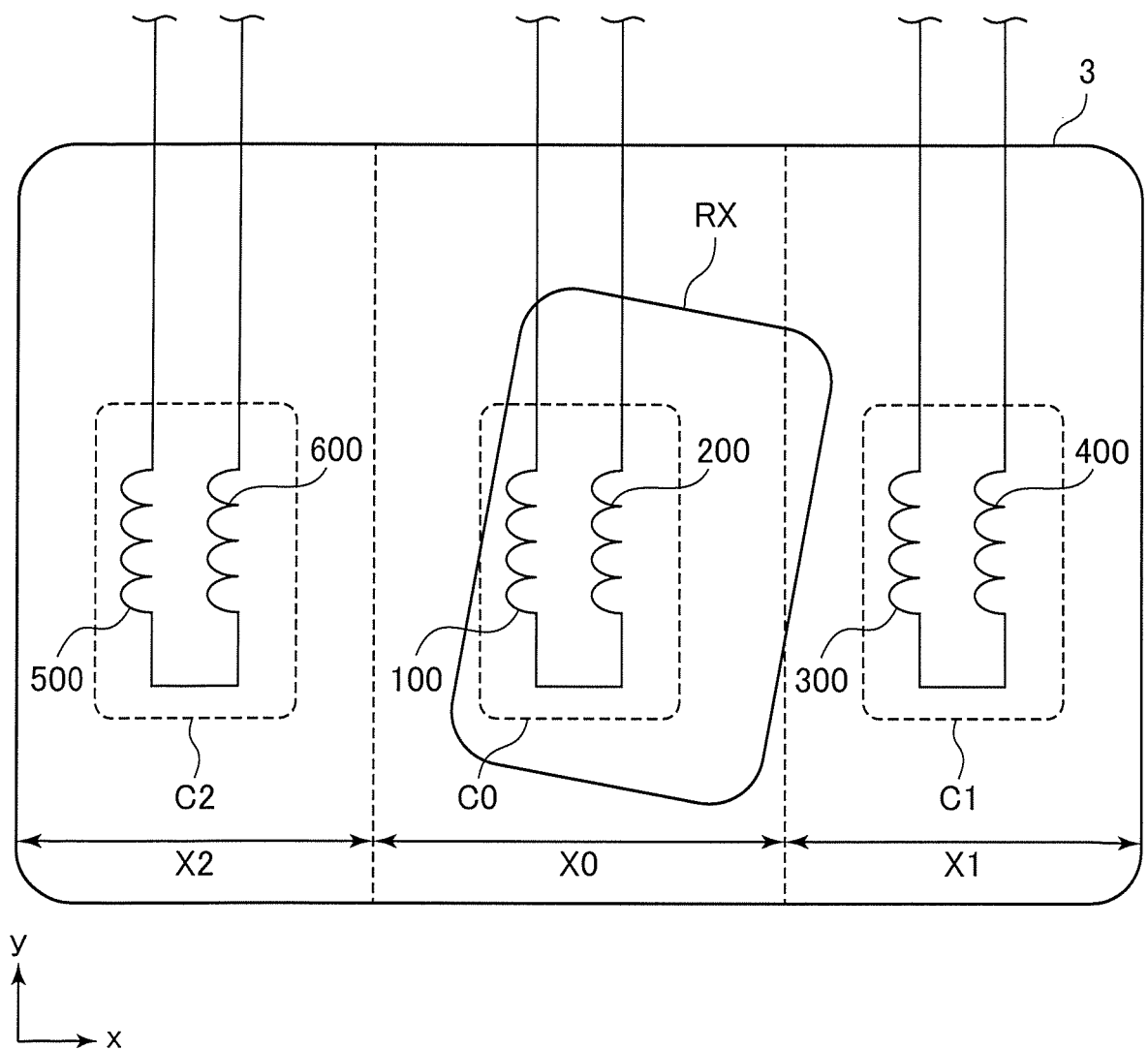
FIG. 5 is a schematic view illustrating the outer appearance of a wireless power transmitting device when the coil component shown in FIG. 1 is used as a transmitting coil of a wireless power transmission system.

FIG. 5 is a schematic view illustrating the outer appearance of a wireless power transmitting device when the coil component 1 according to the present embodiment is used as a transmitting coil of a wireless power transmission system.

In the example illustrated in FIG. 5, the power receiving surface 3 constitutes the xy plane, and a wireless power receiving device RX is placed on the power receiving surface 3. The wireless power receiving device RX is, for example, a mobile terminal such as a smartphone. The power receiving surface 3 and wireless power receiving device RX are not provided with a positioning mechanism for correctly positioning them, and the wireless power receiving device RX is placed on the power receiving surface 3 by a user without any particular care. Then, as illustrated in FIG. 5, when the wireless power receiving device RX placed on the power receiving surface 3 exists in the area X0, the switching circuit 6 illustrated in FIG. 4 selects the center coil C0. It follows that current flows from the power transmitting circuit 4 to center coil C0, whereby power can be transmitted to the wireless power receiving device RX in a wireless manner. On the other hand, when the wireless power receiving device RX placed on the power receiving surface 3 exists in the area X1, the switching circuit 6 selects the first side coil C1. Further, when the wireless power receiving device RX placed on the power receiving surface 3 exists in the area X2, the switching circuit 6 selects the second side coil C2. As a result, proper power transmission can be performed regardless of the position of the wireless power receiving device RX on the power receiving surface 3. The position of the wireless power receiving device RX may be determined directly by using a position sensor or the like or indirectly through detection of a change in impedance or in power waveform in the coil component 1.

Figure 6:
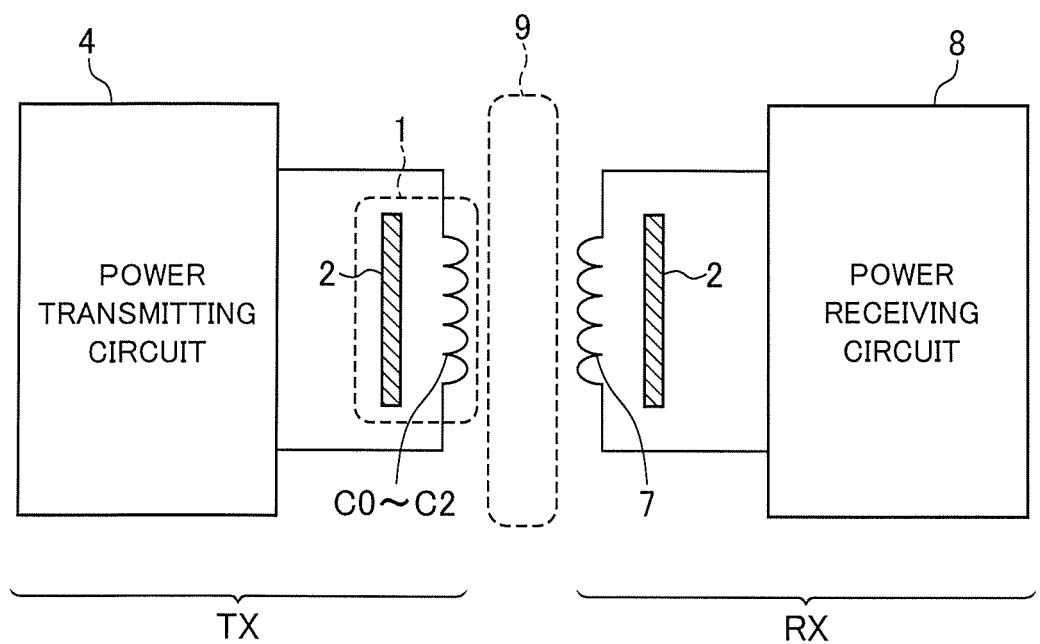
FIG. 6 is a schematic view illustrating the configuration of the wireless power transmission system using the coil component shown in FIG. 1.

FIG. 6 is a schematic view illustrating the configuration of the wireless power transmission system using the coil component 1 according to the present embodiment.

The wireless power transmission system illustrated in FIG. 6 is a system including a wireless power transmitting device TX and a wireless power receiving device RX, and power transmitting coils C0 to C2 included in the wireless power transmitting device TX and a power receiving coil 7 included in the wireless power receiving device RX are made to face each other through a space 9, whereby power transmission is performed by wireless. The power transmitting coils C0 to C2 are connected to the power transmitting circuit 4 including a power supply circuit, an inverter circuit, a resonant circuit, and the like to be supplied with AC current from the power transmitting circuit 4. The power receiving coil 7 is connected to a power receiving circuit 8 including a resonant circuit, a rectifying circuit, a smoothing circuit, and the like. When the power transmitting coils C0 to C2 and the power receiving coil 7 are made face each other so as to be magnetically coupled, power can be transmitted by wireless from the wireless power transmitting device TX to the wireless power receiving device RX through the space 9.

The magnetic sheets 2 are disposed, respectively, on the side opposite to the space 9 with respect to the power transmitting coils C0 to C2 and on the side opposite to the space 9 with respect to the power receiving coil 7. The magnetic sheet 2 plays a role of increasing the inductances of the power transmitting coils C0 to C2 and power receiving coil 7, thereby allowing achievement of more efficient power transmission.

The following describes in more detail the shapes of the respective coil patterns 100 and 200 constituting the center coil C0.

Figure 7:
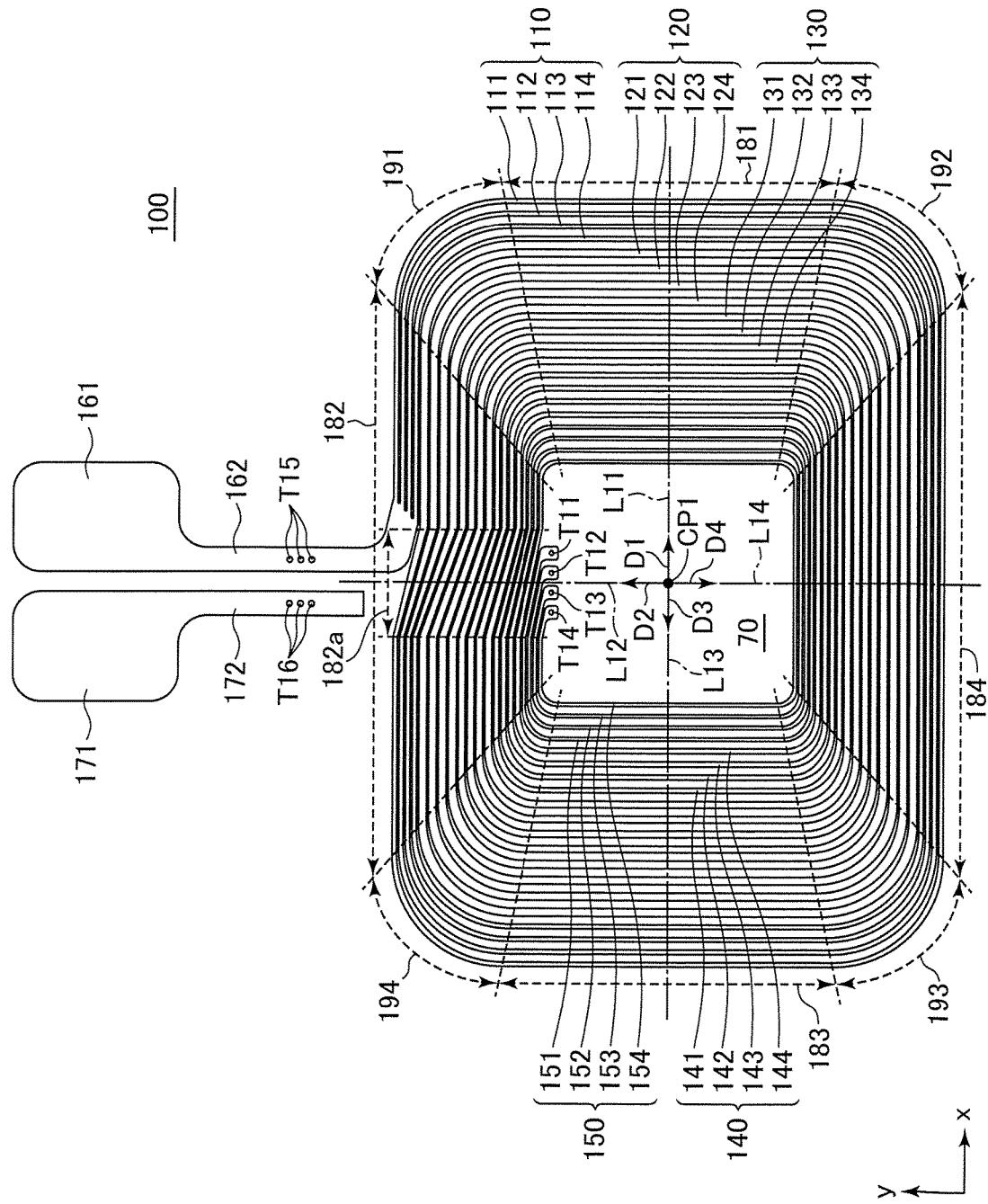
FIG. 7 is a schematic plan view for explaining the pattern shape of the coil pattern 100 as viewed from the one sides of the insulating substrates.

FIG. 7 is a schematic plan view for explaining the pattern shape of the coil pattern 100 as viewed from the one sides 11, 21, and 31 of the insulating substrates 10, 20, and 30, respectively.

As illustrated in FIG. 7, the coil pattern 100 is constituted by a planar conductor spirally wound in a plurality of turns. In the example of FIG. 7, the coil pattern 100 has a five-turn configuration including turns 110, 120, 130, 140, and 150. The turn 110 constitutes the outermost turn, and the turn 150 constitutes the innermost turn. The turns 110, 120, 130, 140, and 150 are each radially divided into four parts by three spiral slits. As a result, the turn 110 is divided into lines 111 to 114, the turn 120 is divided into lines 121 to 124, the turn 130 is divided into lines 131 to 134, the turn 140 is divided into lines 141 to 144, and the turn 150 is divided into lines 151 to 154. Thus, in terms of lines, the line 111 constitutes the outermost line, and the line 154 constitutes the innermost line.

The lines 111 to 114 of the outermost turn 110 are connected to a terminal electrode pattern 161 through a radially extending lead-out pattern 162. A radially extending lead-out pattern 172 is disposed peripherally adjacent to the lead-out pattern 162 and is connected, at its leading end, to a terminal electrode pattern 171. On the other hand, the inner peripheral ends of the respective lines 151 to 154 of the innermost turn 150 are connected, respectively, to through hole conductors T11 to T14 penetrating the insulating substrate (10, 20, 30).

The turns 110, 120, 130, 140, and 150 constituting the coil pattern 100 each have linear areas 182 and 184 extending in the x-direction, linear areas 181 and 183 extending in the y-direction, and curved areas 191 to 194 positioned between the two adjacent linear areas. The linear area 182 includes a transition area 182a as a boundary between the turns 110, 120, 130, 140, and 150, and the turns 110, 120, 130, 140, and 150 each therefore obliquely extend by one turn in the y-direction.

In the coil pattern 100, the width of lines in the same turn is constant, and the width of the same line changes between different turns. Further, in the same turn, a space width between lines differs depending on the planar position. The definitions of the "line width" and "space width" are as follows. A reference point CP1 is set in the inner diameter area 70. Then, a virtual line L11 extending in the positive x-direction is defined with the reference point CP1 as a starting point, a virtual line L12 extending in the positive y-direction is defined with the reference point CP1 as a starting point, a virtual line L13 extending in the negative x-direction is defined with the reference point CP1 as a starting point, and a virtual line L14 extending in the negative y-direction is defined with the reference point CP1 as a starting point. The positive x-direction, positive y-direction, negative x-direction, and negative y-direction may be rephrased, respectively, as first to fourth directions D1 to D4 starting from the reference point CP1. The virtual lines L11 to L14 are perpendicular, respectively, to the linear areas 181 to 184. In this definition, the width of each of the lines along the virtual lines L11 to L14 is the "line width", and the width of each of the spaces along the virtual lines L11 to L14 is the "space width".

When the reference point CP1 is set at the center point of the coil pattern 100, the virtual line L12 passes between the through hole conductors T12 and T13, then passes the transition area 182a, and passes between the lead-out patterns 162 and 172. In this case, the positions of the through hole conductors T11 and T14 are symmetric with respect to the virtual line L12, and the positions of the through hole conductors T12 and T13 are also symmetric with respect to the virtual line L12. However, the reference point CP1 need not necessarily be set at the center point of the coil pattern 100 but may be offset in the x-direction so as not to make the virtual line L12 pass the transition area 182a.

Figure 8:
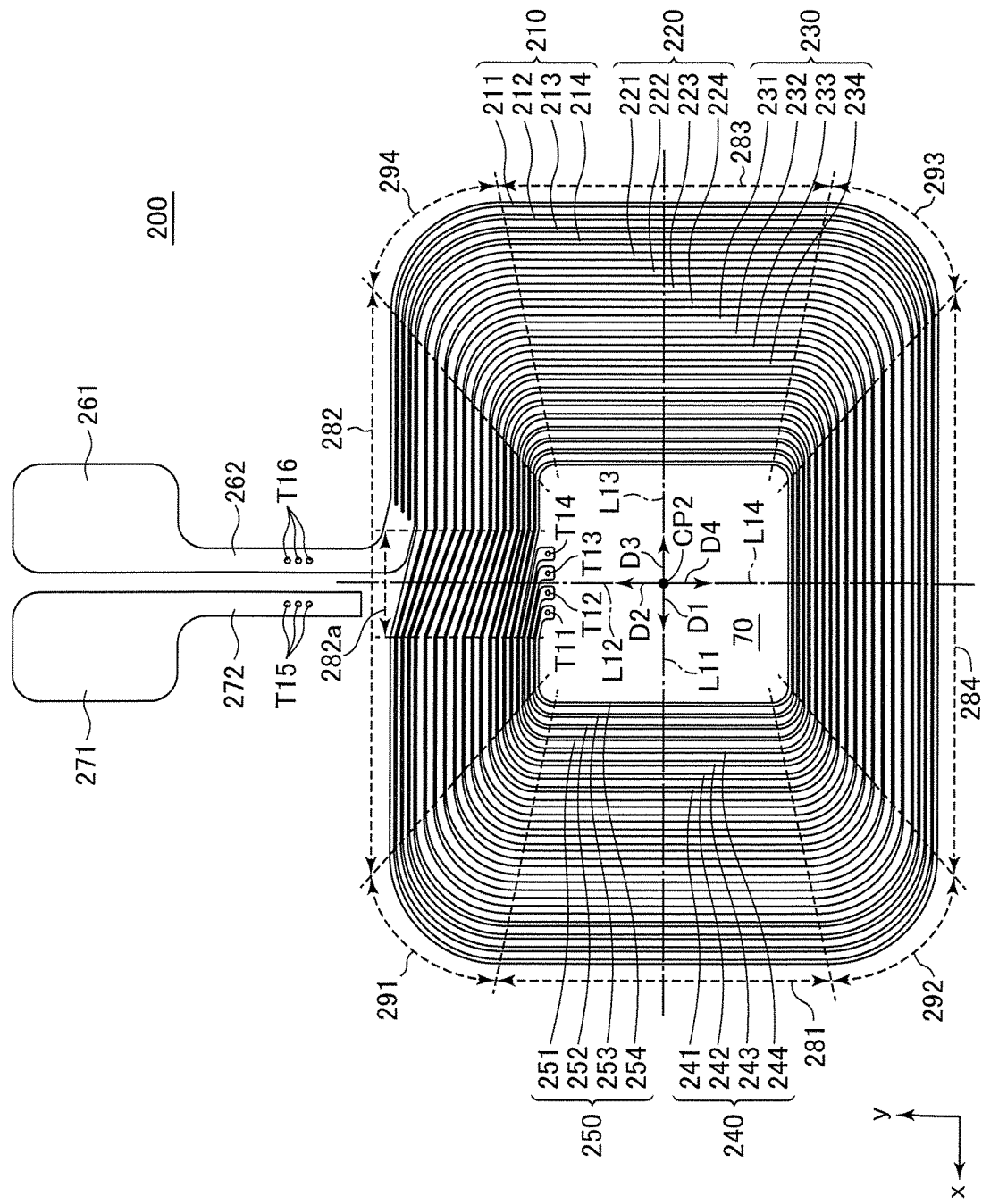
FIG. 8 is a schematic plan view for explaining the pattern shape of the coil pattern 200 as viewed from the other sides of the insulating substrates.

FIG. 8 is a schematic plan view for explaining the pattern shape of the coil pattern 200 as viewed from the other sides 12, 22, and 32 of the insulating substrates 10, 20, and 30, respectively.

As illustrated in FIG. 8, the coil pattern 200 has the same pattern shape as the coil pattern 100. Thus, the coil patterns 100 and 200 can be produced using the same mask, allowing a significant reduction in manufacturing cost. The coil pattern 200 has a five-turn configuration including turns 210, 220, 230, 240, and 250. The turn 210 constitutes the outermost turn, and the turn 250 constitutes the innermost turn. The turns 210, 220, 230, 240, and 250 are each radially divided into four parts by three spiral slits. As a result, the turn 210 is divided into lines 211 to 214, the turn 220 is divided into lines 221 to 224, the turn 230 is divided into lines 231 to 234, the turn 240 is divided into lines 241 to 244, and the turn 250 is divided into lines 251 to 254. Thus, in terms of lines, the line 211 constitutes the outermost line, and the line 254 constitutes the innermost line.

The lines 211 to 214 of the outermost turn 210 are connected to a terminal electrode pattern 261 through a radially extending lead-out pattern 262. A radially extending lead-out pattern 272 is disposed peripherally adjacent to the lead-out pattern 262 and is connected, at its leading end, to a terminal electrode pattern 271. The lead-out pattern 272 is connected to the lead-out pattern 162 illustrated in FIG. 7 through a plurality of through hole conductors T15. Similarly, the lead-out pattern 262 is connected to the lead-out pattern 172 illustrated in FIG. 7 through a plurality of through hole conductors T16. As a result, the terminal electrode pattern 161 and terminal electrode pattern 271 are short-circuited, and the terminal electrode pattern 171 and the terminal electrode pattern 261 are short-circuited.

On the other hand, the inner peripheral ends of the respective lines 251 to 254 of the innermost turn 250 are connected, respectively, to through hole conductors T14 to T11. As a result, the inner peripheral ends of the respective lines 251 to 254 are connected, respectively, to the inner peripheral ends of the lines 154, 153, 152, and 151 of the coil pattern 100.

The turns 210, 220, 230, 240, and 250 constituting the coil pattern 200 each have linear areas 282 and 284 extending in the x-direction, linear areas 281 and 283 extending in the y-direction, and curved areas 291 to 294 positioned between the two adjacent linear areas. The linear area 282 includes a transition area 282a as a boundary between the turns 210, 220, 230, 240, and 250, and the turns 210, 220, 230, 240, and 250 each obliquely extend by one turn in the y-direction.

In the coil pattern 200 as well, the width of lines in the same turn is constant, and the width of the same line changes between different turns. Further, in the same turn, a space width between lines differs depending on the planar position.

When a reference point CP2 positioned in the inner diameter area 70 is set at the center point of the coil pattern 200, the virtual line L12 passes between the through hole conductors T12 and T13, then passes the transition area 282a, and passes between the lead-out patterns 262 and 272. In this case, the positions of the through hole conductors T11 and T14 are symmetric with respect to the virtual line L12, and the positions of the through hole conductors T12 and T13 are also symmetric with respect to the virtual line L12. However, the reference point CP2 may not necessarily be set at the center point of the coil pattern 200 but may be offset in the x-direction so as not to make the virtual line L12 pass the transition area 282a.

Figure 9:
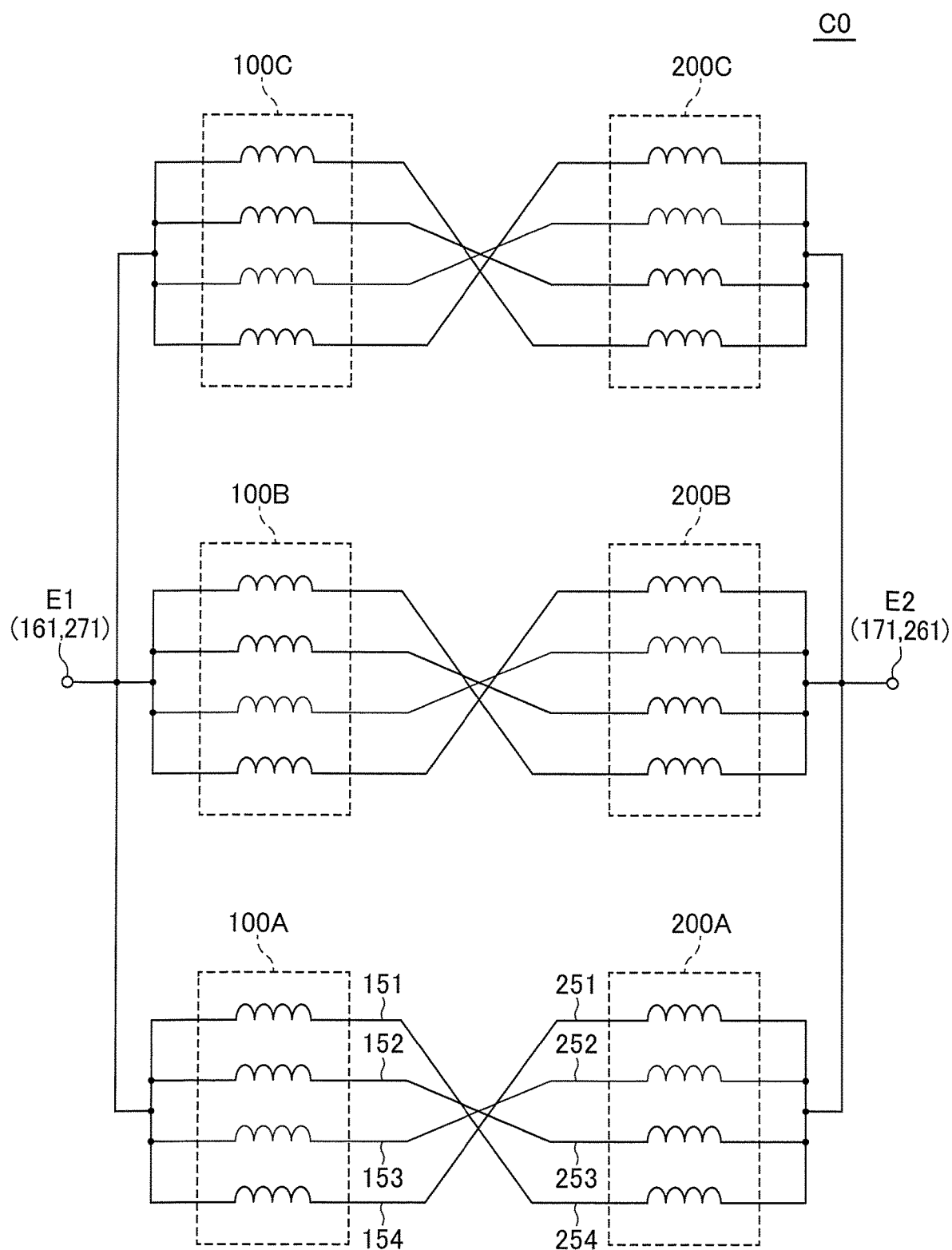
FIG. 9 is an equivalent circuit diagram of the center coil.

When the coil patterns 100 and 200 are made to overlap each other, the inner peripheral ends of the lines 151, 152, 153, and 154 of the coil pattern 100 are connected, respectively, to the inner peripheral ends of the lines 254, 253, 252, and 251 of the coil pattern 200 through the through hole conductors T11 to T14. As a result, the coil patterns 100 and 200 are connected in series to each other as illustrated in FIG. 9 to constitute a spiral coil having 10 turns in total. The center coil C0 has a configuration in which three coil units each constituted by the coil patterns 100 and 200 are connected in parallel, so that a current about three times that obtained when only one coil unit is used can be made to flow. A terminal electrode E1 illustrated in FIG. 9 corresponds to the terminal electrode patterns 161 and 271, and a terminal electrode E2 corresponds to the terminal electrode patterns 171 and 261.

FIGS. 10 to 14 are schematic cross-sectional views for explaining the line and space widths of each of the turns 110, 120, 130, 140, and 150 constituting the coil pattern 100.

Figure 10:
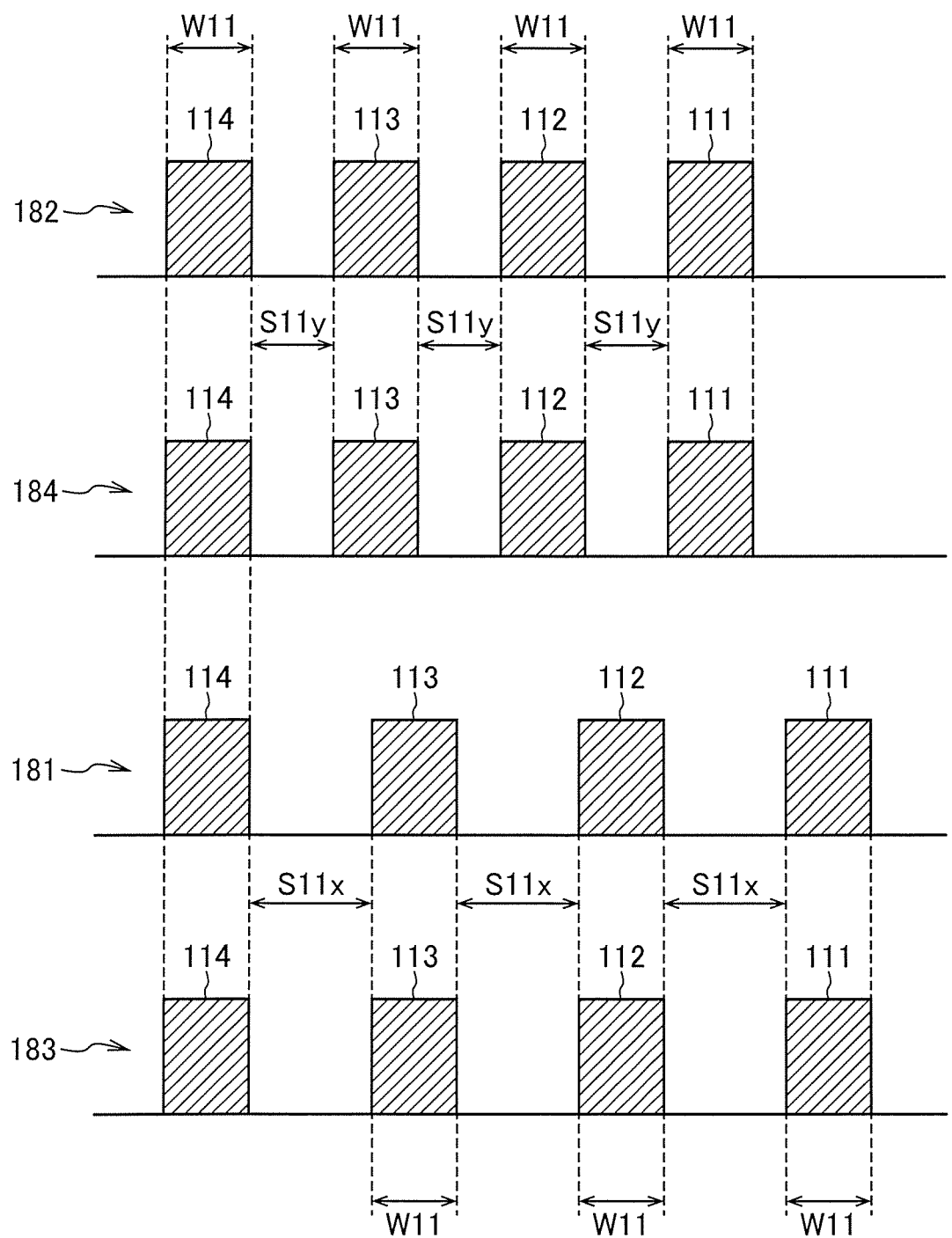
FIGS. 10 to 14 are schematic cross-sectional views for explaining the line and space widths of each of the turns 110, 120, 130, 140, and 150 constituting the coil pattern shown in FIG. 7.

As illustrated in FIG. 10, the lines 111 to 114 constituting the turn 110 of the coil pattern 100 have the same line width W11. That is, the line width is not changed from line to line or depending on the planar position. On the other hand, the space width in the turn 110 is S11y in the linear areas 182 and 184 and is S11x in the linear areas 181 and 183, and the S11x and S11y have a relationship of S11x>S11y. That is, the space width S11y in the y-direction is small in the linear areas 182 and 184 where the lines 111 to 114 extend in the x-direction, while the space width S11x in the x-direction is large in the linear areas 181 and 183 where the lines 111 to 114 extend in the y-direction.

Figure 11:
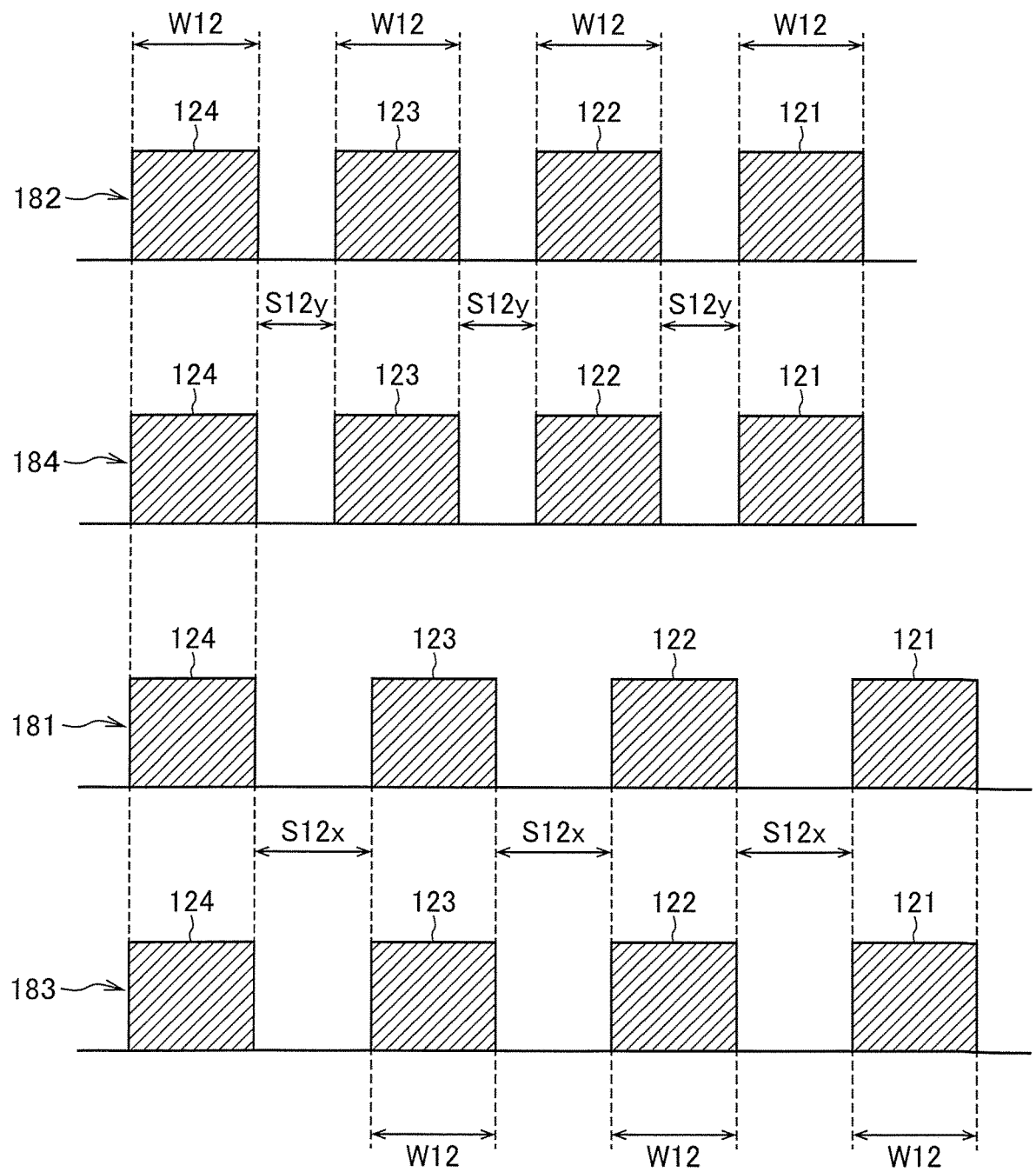

As illustrated in FIG. 11, the lines 121 to 124 constituting the turn 120 of the coil pattern 100 have the same line width W12. That is, the line width is not changed from line to line or depending on the planar position. The line widths W11 and W12 have a relationship of W11<W12. On the other hand, the space width in the turn 120 is S12y in the linear areas 182 and 184 and is S12x in the linear areas 181 and 183, and the S12x and S12y have a relationship of S12x>S12y.

Figure 12:
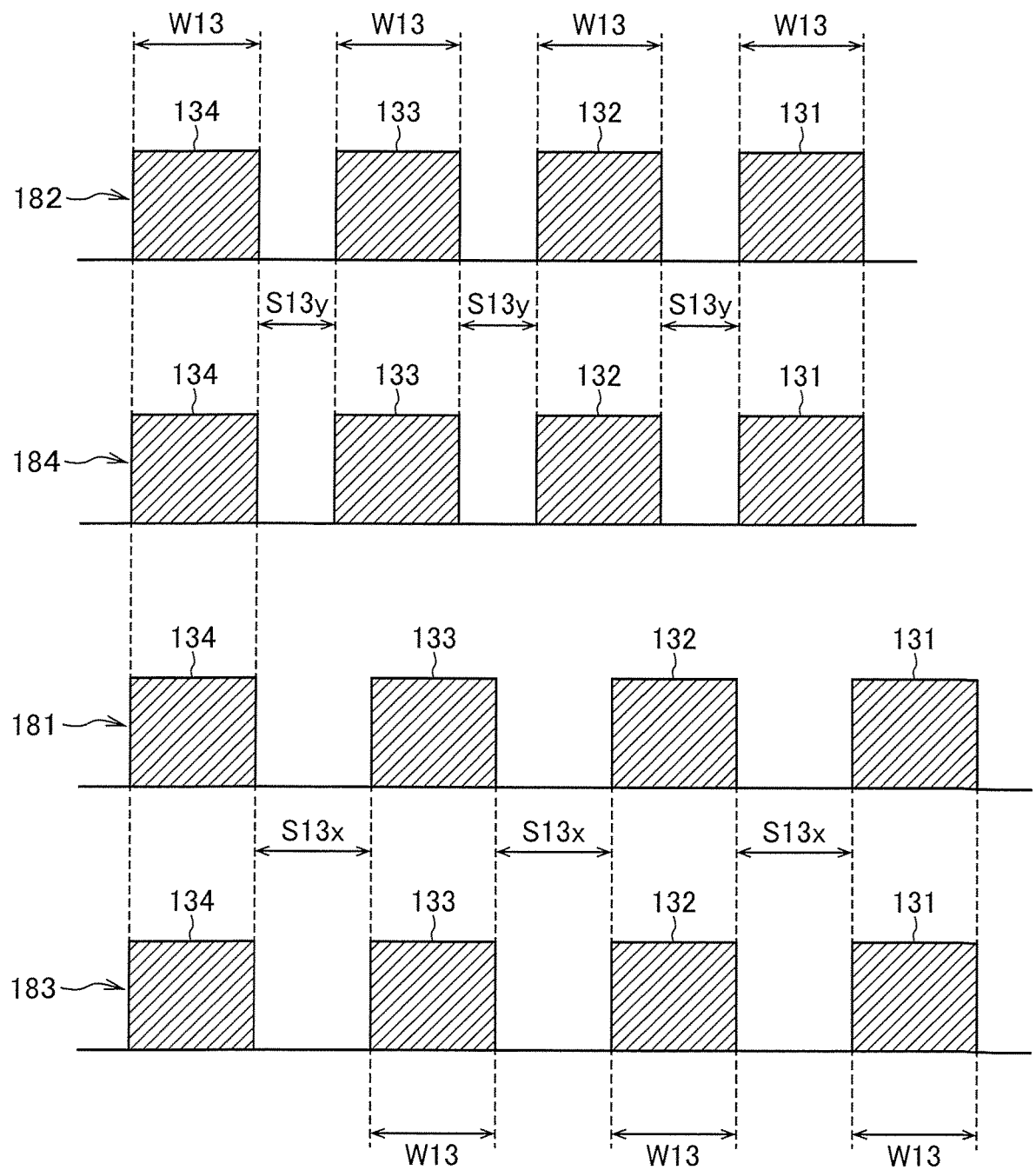

As illustrated in FIG. 12, the lines 131 to 134 constituting the turn 130 of the coil pattern 100 have the same line width W13. That is, the line width is not changed from line to line or depending on the planar position. The line widths W12 and W13 may have a relationship of W12=W13. On the other hand, the space width in the turn 130 is S13y in the linear areas 182 and 184 and is S13x in the linear areas 181 and 183, and the S13x and S13y have a relationship of S13x>S13y.

Figure 13:
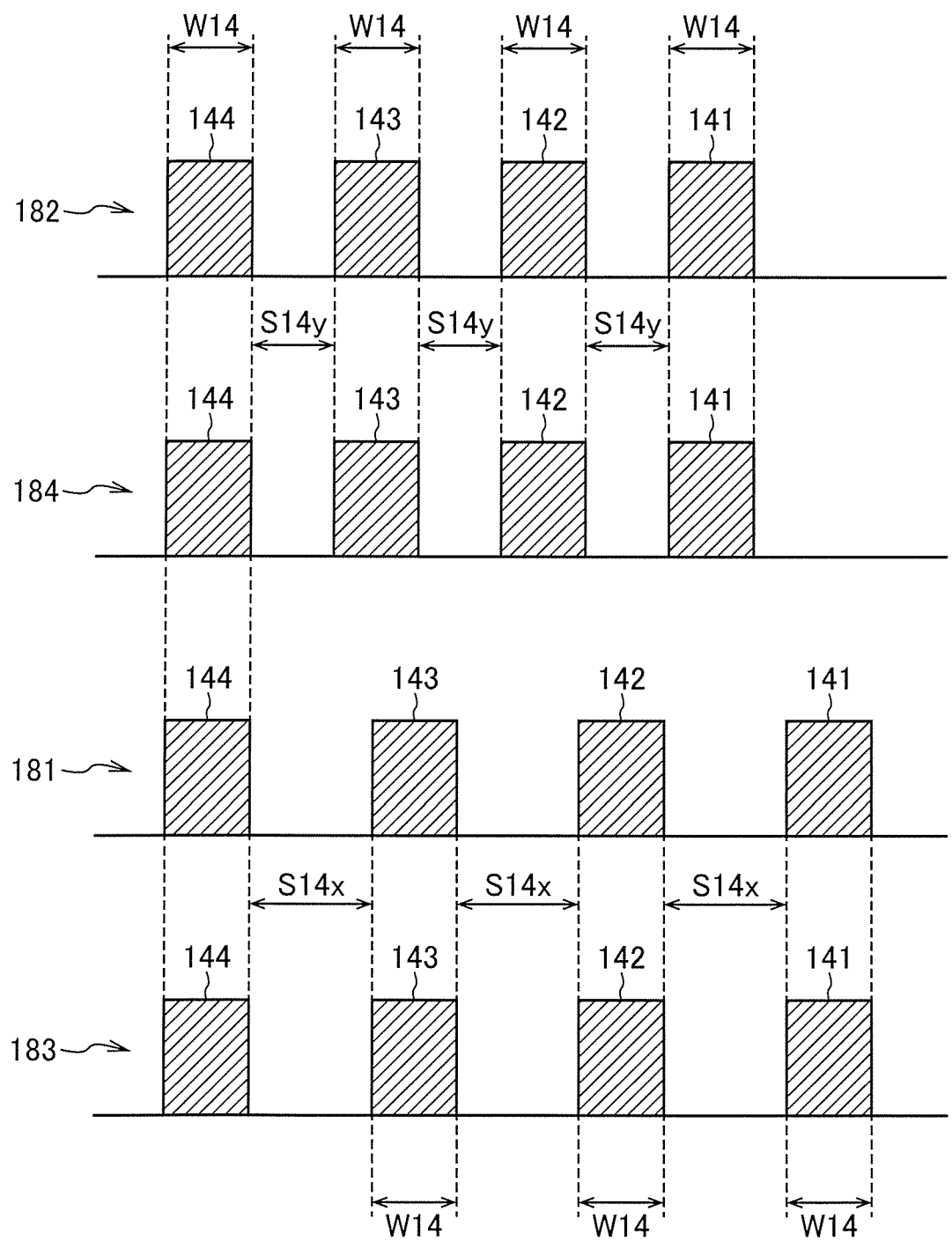

As illustrated in FIG. 13, the lines 141 to 144 constituting the turn 140 of the coil pattern 100 have the same line width W14. That is, the line width is not changed from line to line or depending on the planar position. The line widths W11 and W14 may have a relationship of W11=W14. On the other hand, the space width in the turn 140 is S14y in the linear areas 182 and 184 and is S14x in the linear areas 181 and 183, and the S14x and S14y have a relationship of S14x>S14y.

Figure 14:
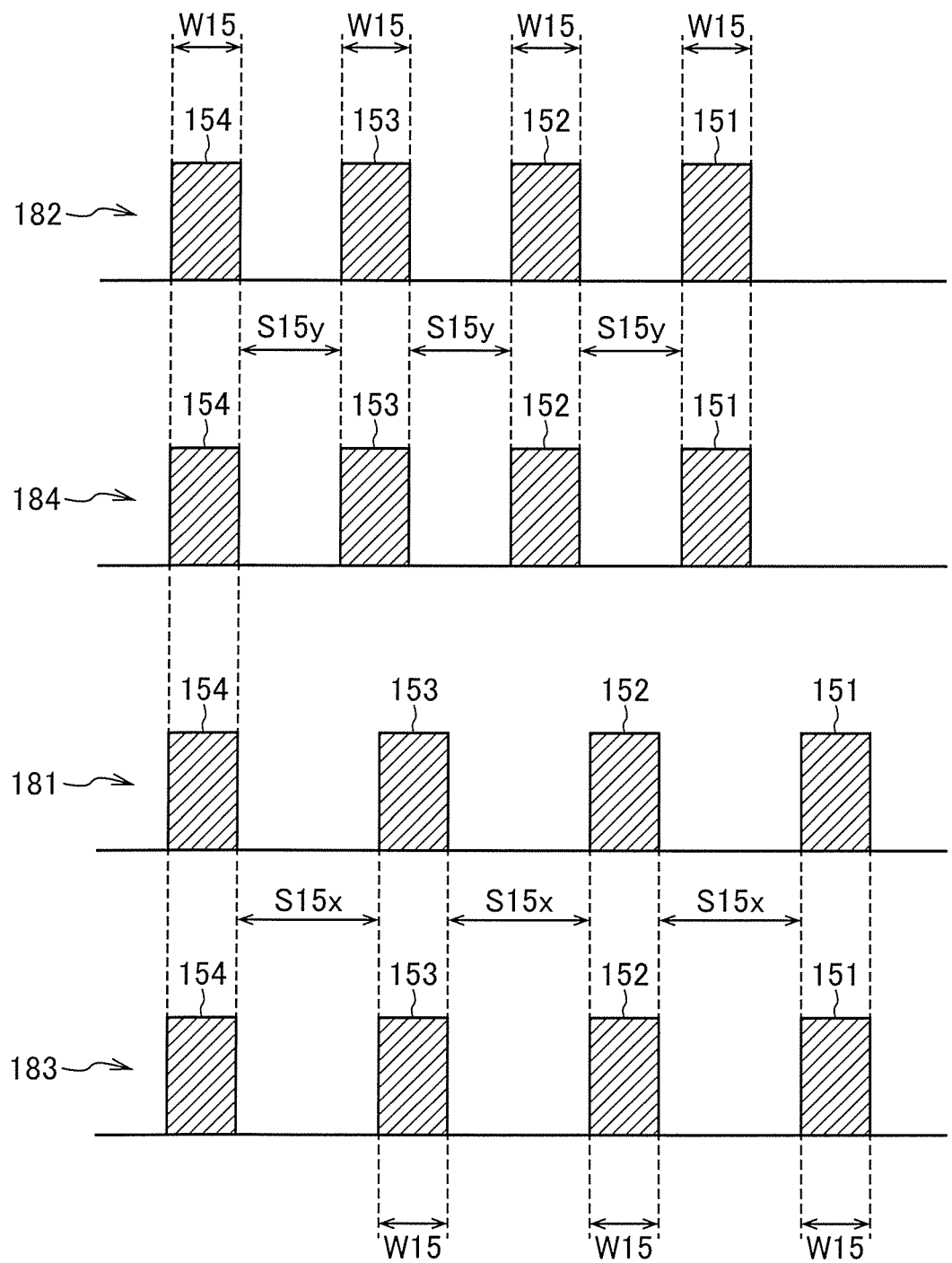

As illustrated in FIG. 14, the lines 151 to 154 constituting the turn 150 of the coil pattern 100 have the same line width W15. That is, the line width is not changed from line to line or depending on the planar position. The line widths W11 and W15 may have a relationship of W11=W15 or W11>W15. On the other hand, the space width in the turn 150 is S15y in the linear areas 182 and 184 and is S15x in the linear areas 181 and 183, and the S15x and S15y have a relationship of S15x>S15y.

The relationship among the S11x to S15x and relationship among the S11y to S15y may be: S11x=S12x=S13x=S14x=S15x, S11y=S12y=S13y=S14y=S15y.

As described above, in the coil pattern 100, the space width between the lines differs in the same turn depending on the planar position. Specifically, the space widths S11y to S15y in the y-direction are small in the linear areas 182 and 184, while the space widths S11x to S15x in the x-direction are large in the linear areas 181 and 183. Thus, it is possible to enlarge the outer shape of the coil pattern 100 in the positive x-direction and negative x-direction without enlarging the outer shape thereof in the y-direction and without significantly changing the shape and size of the inner diameter area 70. As a result, the area X0 illustrated in FIGS. 2 and 5 is enlarged, so that when the thus configured center coil C0 is used as a power transmitting coil of a wireless power transmission system, it is possible to alleviate a reduction in transmission efficiency due to deviation of a wireless power receiving device in the x-direction. Further, the space widths S11y to S15y in the linear area 182 and those in the linear area 184 are the same, and the space widths S11x to S15x in the linear area 181 and those in the linear area 183 are the same, so that the inner diameter area 70 is disposed at the center of the outer shape of the coil pattern 100 without being offset.

Further, in the coil pattern 100, the width of lines in the same turn is constant, and the width of the same line changes between different turns. For example, it is designed such that W15<W11=W14<W12=W13. The change of the line width is made in the curved areas 191 to 194.

The reason that the pattern widths W11 and W15 of the respective outermost and innermost turns 110 and 150 are reduced is that a magnetic field at these portions is strong to cause a large loss due to heat generation by eddy current. That is, when the pattern widths W11 and W15 of the respective outermost and innermost turns 110 and 150 are made smaller than the pattern width W13 of the intermediate turn 130, magnetic flux interfering with the outermost and innermost turns 110 and 150 is reduced, whereby the eddy current can be reduced. Particularly, a magnetic field becomes strongest in the vicinity of the innermost turn 150, so that it is preferable to make the pattern width W15 of the innermost turn 150 smallest.

Further, in terms of the thickness of the conductor pattern constituting the coil pattern 100, the innermost turn 150 may be smaller than the outermost turn 110. Particularly, it is preferable to configure such that the pattern thickness is gradually or stepwise reduced from the outermost turn 110 toward the innermost turn 150. With this configuration, an effect of reducing a loss due to a reduction in the pattern width becomes conspicuous at the inner peripheral side more affected by the eddy current.

The coil pattern 200 has the same pattern shape as the coil pattern 100 and can thus provide the same effects as those in the coil pattern 100. Further, the turns 110, 120, 130, 140, and 150 of the coil pattern 100 and the turns 210, 220, 230, 240, and 250 of the coil pattern 200 are each radially divided into four parts by the spiral slits, so that uneven distribution of current density is reduced, allowing a reduction in DC resistance or AC resistance. In addition, the outermost lines 111, 121, 131, 141, and 151 in each of the turns constituting the coil pattern 100 are connected, respectively, to the innermost lines 215, 225, 235, 245, and 255 of each of turns constituting the coil pattern 200, and the innermost lines 115, 125, 135, 145, and 155 in each of the turns constituting the coil pattern 100 are connected, respectively, to the outermost lines 211, 221, 231, 241, and 251 of each of turns constituting the coil pattern 200, so that a difference in the electrical length of line between inner and outer peripheries can be eliminated. This makes current density distribution more even, allowing a further reduction in DC resistance or AC resistance.

The following describes in more detail the shapes of the respective coil patterns 300 and 400 constituting the side coil C1 and those of the respective coil patterns 500 and 600 constituting the side coil C2.

Figure 15:
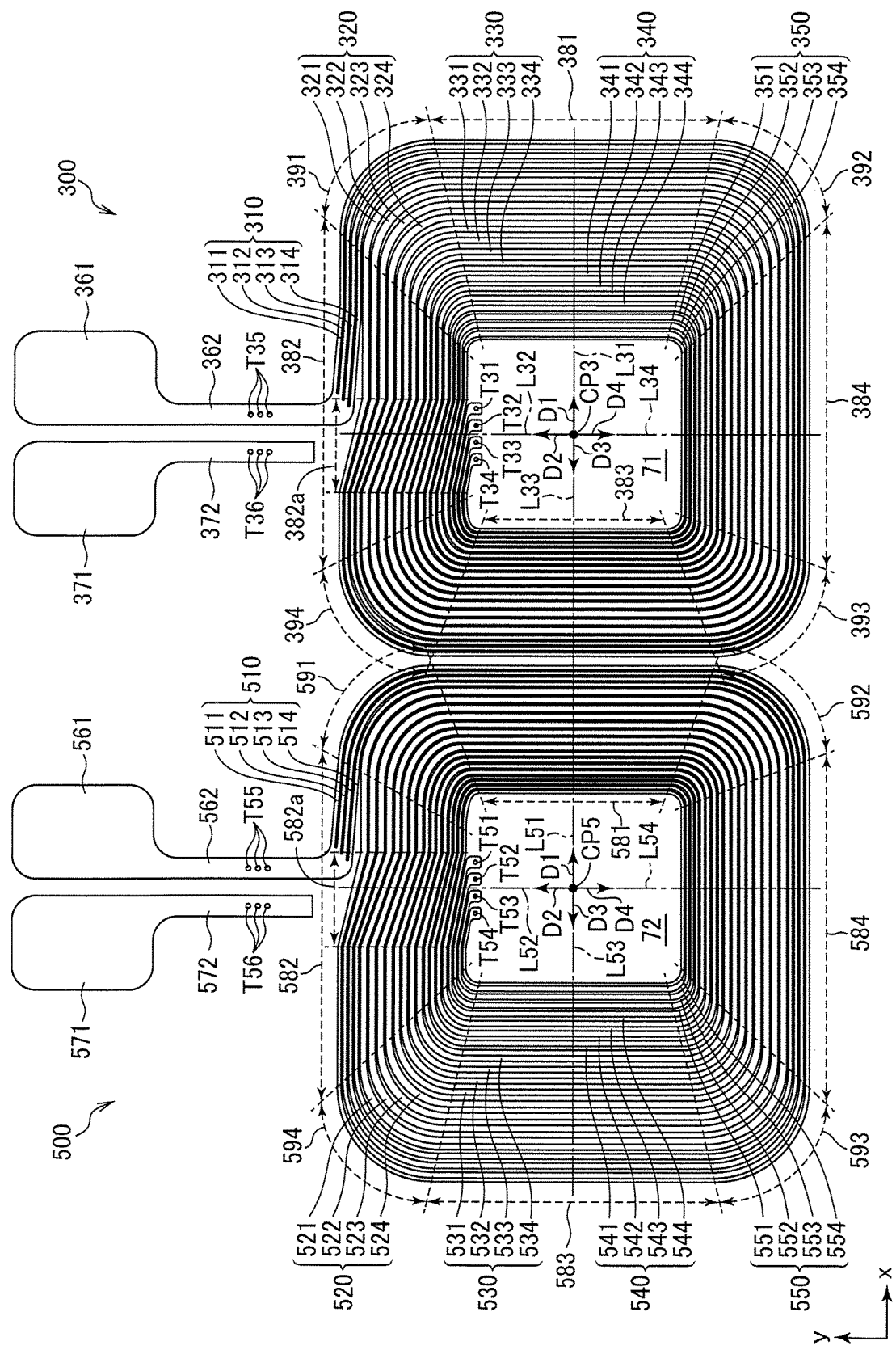
FIG. 15 is a schematic plan view for explaining the pattern shapes of the respective coil patterns 300 and 500 as viewed from the one sides of the insulating substrates.
Figure 16:
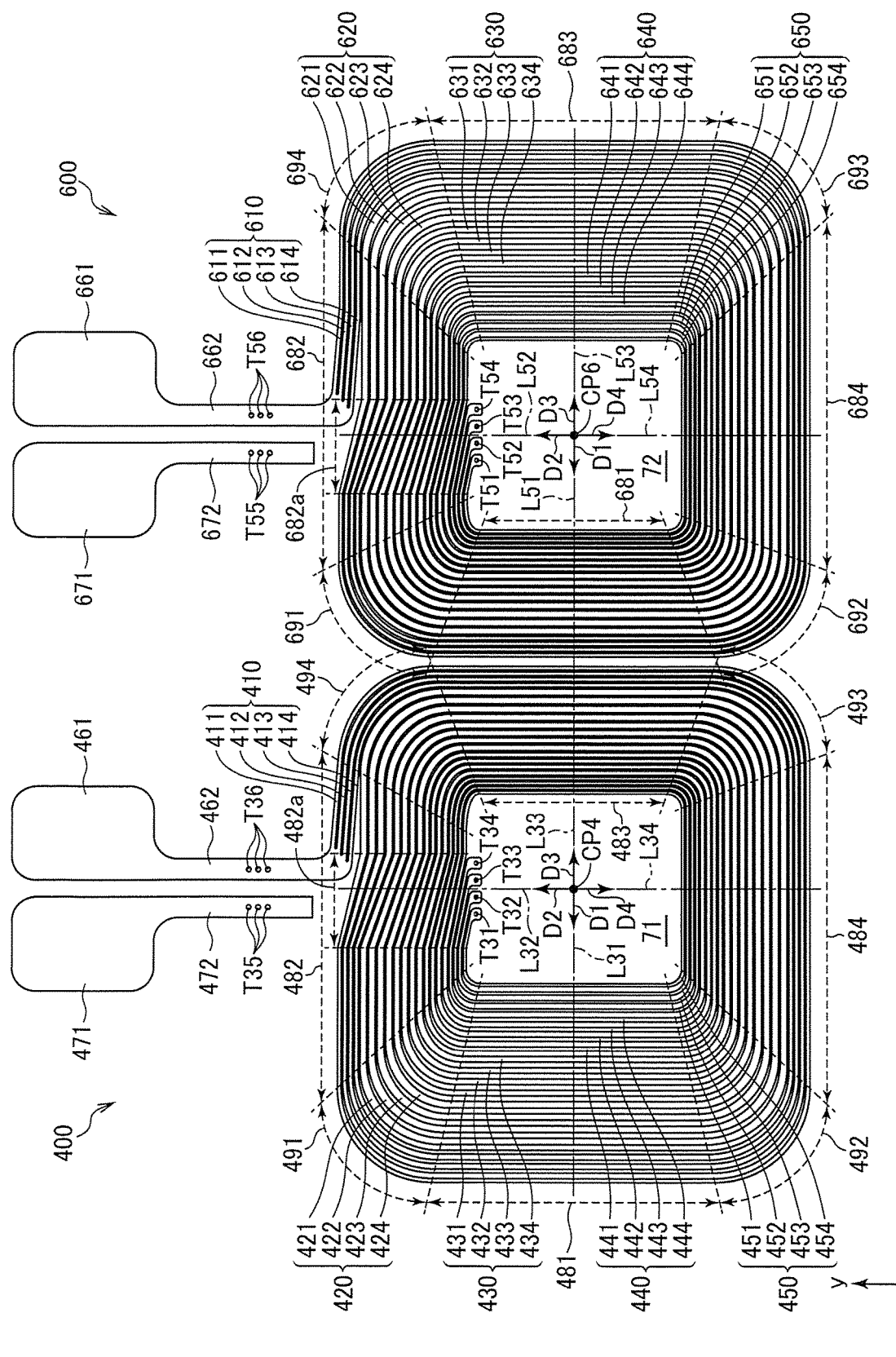
FIG. 16 is a schematic plan view for explaining the pattern shapes of the respective coil patterns 400 and 600 as viewed from the other sides of the insulating substrates.

FIG. 15 is a schematic plan view for explaining the pattern shapes of the respective coil patterns 300 and 500 as viewed from the one sides 41, 51, and 61 of the insulating substrates 40, 50, and 60, respectively. FIG. 16 is a schematic plan view for explaining the pattern shapes of the respective coil patterns 400 and 600 as viewed from the other sides 42, 52, and 62 of the insulating substrates 40, 50, and 60, respectively.

As illustrated in FIG. 15, the coil pattern 300 is constituted by a planar conductor spirally wound in a plurality of turns. In the example of FIG. 15, the coil pattern 300 has a five-turn configuration including turns 310, 320, 330, 340, and 350. The turn 310 constitutes the outermost turn, and the turn 350 constitutes the innermost turn. The turns 310, 320, 330, 340, and 350 are each radially divided into four parts by three spiral slits. As a result, the turn 310 is divided into lines 311 to 314, the turn 320 is divided into lines 321 to 324, the turn 330 is divided into lines 331 to 334, the turn 340 is divided into lines 341 to 344, and the turn 350 is divided into lines 351 to 354. Thus, in terms of lines, the line 311 constitutes the outermost line, and the line 354 constitutes the innermost line.

The lines 311 to 314 of the outermost turn 310 are connected to a terminal electrode pattern 361 through a radially extending lead-out pattern 362. A radially extending lead-out pattern 372 is disposed peripherally adjacent to the lead-out pattern 362 and is connected, at its leading end, to a terminal electrode pattern 371. On the other hand, the inner peripheral ends of the respective lines 351 to 354 of the innermost turn 350 are connected, respectively, to through hole conductors T31 to T34 penetrating the insulating substrate (40, 50, 60).

The turns 310, 320, 330, 340, and 350 constituting the coil pattern 300 each have linear areas 382 and 384 extending in the x-direction, linear areas 381 and 383 extending in the y-direction, and curved areas 391 to 394 positioned between the two adjacent linear areas. The linear area 382 includes a transition area 382a as a boundary between the turns 310, 320, 330, 340, and 350, and the turns 310, 320, 330, 340, and 350 each obliquely extend by one turn in the y-direction.

In the coil pattern 300, the width of lines in the same turn is constant, and the width of the same line changes between different turns. Further, in the same turn, a space width between lines differs depending on the planar position.

When a reference point CP3 positioned in the inner diameter area 71 is set at the center point of the coil pattern 300, a virtual line L32 passes between through hole conductors T32 and T33, then passes the transition area 382a, and passes between the lead-out patterns 362 and 372. In this case, the positions of the through hole conductors T31 and T34 are symmetric with respect to the virtual line L32, and the positions of the through hole conductors T32 and T33 are also symmetric with respect to the virtual line L32. However, the reference point CP3 may not necessarily be set at the center point of the coil pattern 300 but may be offset in the x-direction so as not to make the virtual line L32 pass the transition area 382a.

When the coil pattern 300 is made to overlap the coil pattern 100, a virtual line L33 of the coil pattern 300 and the virtual line L11 of the coil pattern 100 partially coincide with each other in a plan view. As a result, the virtual line L33 passes the inner diameter area 70 of the coil pattern 100 in a plan view, and the virtual line L11 passes the inner diameter area 71 of the coil pattern 300 in a plan view.

As illustrated in FIG. 16, the coil pattern 400 has the same pattern shape as the coil pattern 500. Thus, the coil patterns 400 and 500 can be produced using the same mask, allowing a significant reduction in manufacturing cost.

As illustrated in FIG. 16, the coil pattern 400 has a five-turn configuration including turns 410, 420, 430, 440, and 450. The turn 410 constitutes the outermost turn, and turn 450 constitutes the innermost turn. The turns 410, 420, 430, 440, and 450 are each radially divided into four parts by three spiral slits. As a result, the turn 410 is divided into lines 411 to 414, the turn 420 is divided into lines 421 to 424, the turn 430 is divided into lines 431 to 434, the turn 440 is divided into lines 441 to 444, and the turn 450 is divided into lines 451 to 454. Thus, in terms of lines, the line 411 constitutes the outermost line, and the line 454 constitutes the innermost line.

The lines 411 to 414 of the outermost turn 410 are connected to a terminal electrode pattern 461 through a radially extending lead-out pattern 462. A radially extending lead-out pattern 472 is disposed peripherally adjacent to the lead-out pattern 462 and is connected, at its leading end, to a terminal electrode pattern 471. The lead-out pattern 472 is connected to the lead-out pattern 362 illustrated in FIG. 15 through a plurality of through hole conductors T35. Similarly, the lead-out pattern 462 is connected to the lead-out pattern 372 illustrated in FIG. 15 through a plurality of through hole conductors T36. As a result, the terminal electrode pattern 361 and the terminal electrode pattern 471 are short-circuited, and the terminal electrode pattern 371 and terminal electrode pattern 461 are short-circuited.

On the other hand, the inner peripheral ends of the respective lines 451 to 454 of the innermost turn 450 are connected, respectively, to through hole conductors T34 to T31. As a result, the inner peripheral ends of the respective lines 451 to 454 are connected, respectively, to the inner peripheral ends of the lines 354, 353, 352, and 351 of the coil pattern 300.

The turns 410, 420, 430, 440, and 450 constituting the coil pattern 400 each have linear areas 482 and 484 extending in the x-direction, linear areas 481 and 483 extending in the y-direction, and curved areas 491 to 494 positioned between the two adjacent linear areas. The linear area 482 includes a transition area 482a as a boundary between the turns 410, 420, 430, 440, and 450, and hence the turns 410, 420, 430, 440, and 450 each obliquely extend by one turn in the y-direction.

In the coil pattern 400 as well, the width of lines in the same turn is constant, and the width of the same line changes between different turns. Further, in the same turn, a space width between lines differs depending on the planar position.

When a reference point CP4 positioned in the inner diameter area 71 is set at the center point of the coil pattern 400, the virtual line L32 passes between through hole conductors T32 and T33, then passes the transition area 482a, and passes between the lead-out patterns 462 and 472. In this case, the positions of the through hole conductors T31 and T34 are symmetric with respect to the virtual line L32, and the positions of the through hole conductors T32 and T33 are also symmetric with respect to the virtual line L32. However, the reference point CP4 may not necessarily be set at the center point of the coil pattern 400 but may be offset in the x-direction so as not to make the virtual line L32 pass the transition area 482a.

When the coil patterns 300 and 400 are made to overlap each other, the inner peripheral ends of the lines 351, 352, 353, and 354 of the coil pattern 300 are connected, respectively, to the inner peripheral ends of the lines 454, 453, 452, and 451 of the coil pattern 400 through the through hole conductors T31 to T34. As a result, the coil patterns 300 and 400 are connected in series to each other to constitute a spiral coil having 10 turns in total. The first side coil C1 has a configuration in which three coil units each constituted by the coil patterns 300 and 400 are connected in parallel, so that a current about three times that obtained when only one coil unit is used can be made to flow.

FIGS. 17 to 21 are schematic cross-sectional views for explaining the line and space widths of each of the turns 310, 320, 330, 340, and 350 constituting the coil pattern 300.

Figure 17:
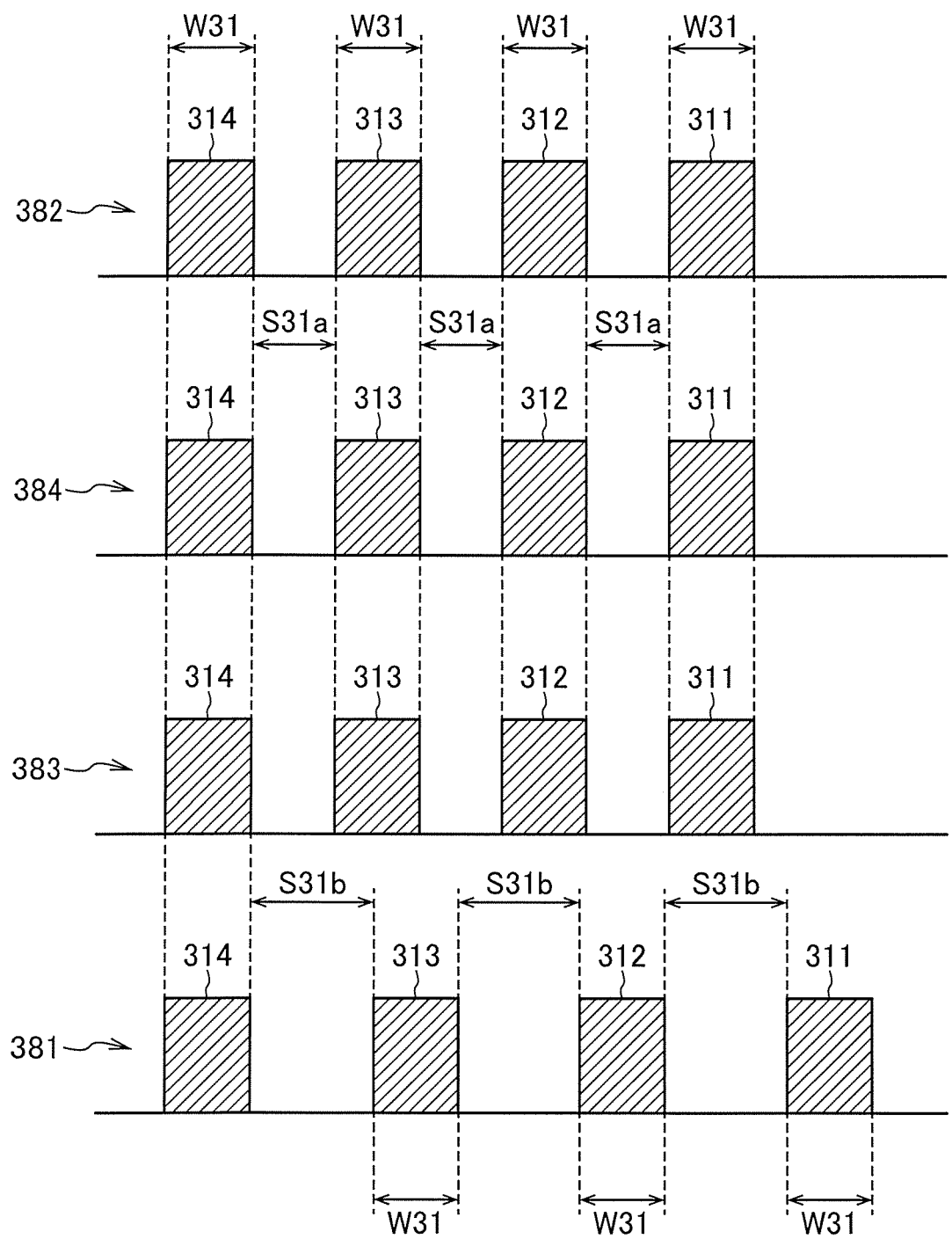
FIGS. 17 to 21 are schematic cross-sectional views for explaining the line and space widths of each of the turns 310, 320, 330, 340, and 350 constituting the coil pattern shown in FIG. 15.

As illustrated in FIG. 17, the lines 311 to 314 constituting the turn 310 of the coil pattern 300 have the same line width W31. That is, the line width is not changed from line to line or depending on the planar position. On the other hand, the space width in the turn 310 is S31a in the linear areas 382 to 384 and is S31b in the linear area 381, and the S31a and S31b have a relationship of S31b>S31a. That is, the space width S31a is small in the linear area 383 where the lines 311 to 314 extend in the y-direction and linear areas 382 and 384 where the lines 311 to 314 extend in the x-direction, while the space width S31b is large in the linear area 381 where the lines 311 to 314 extend in the y-direction.

Figure 18:
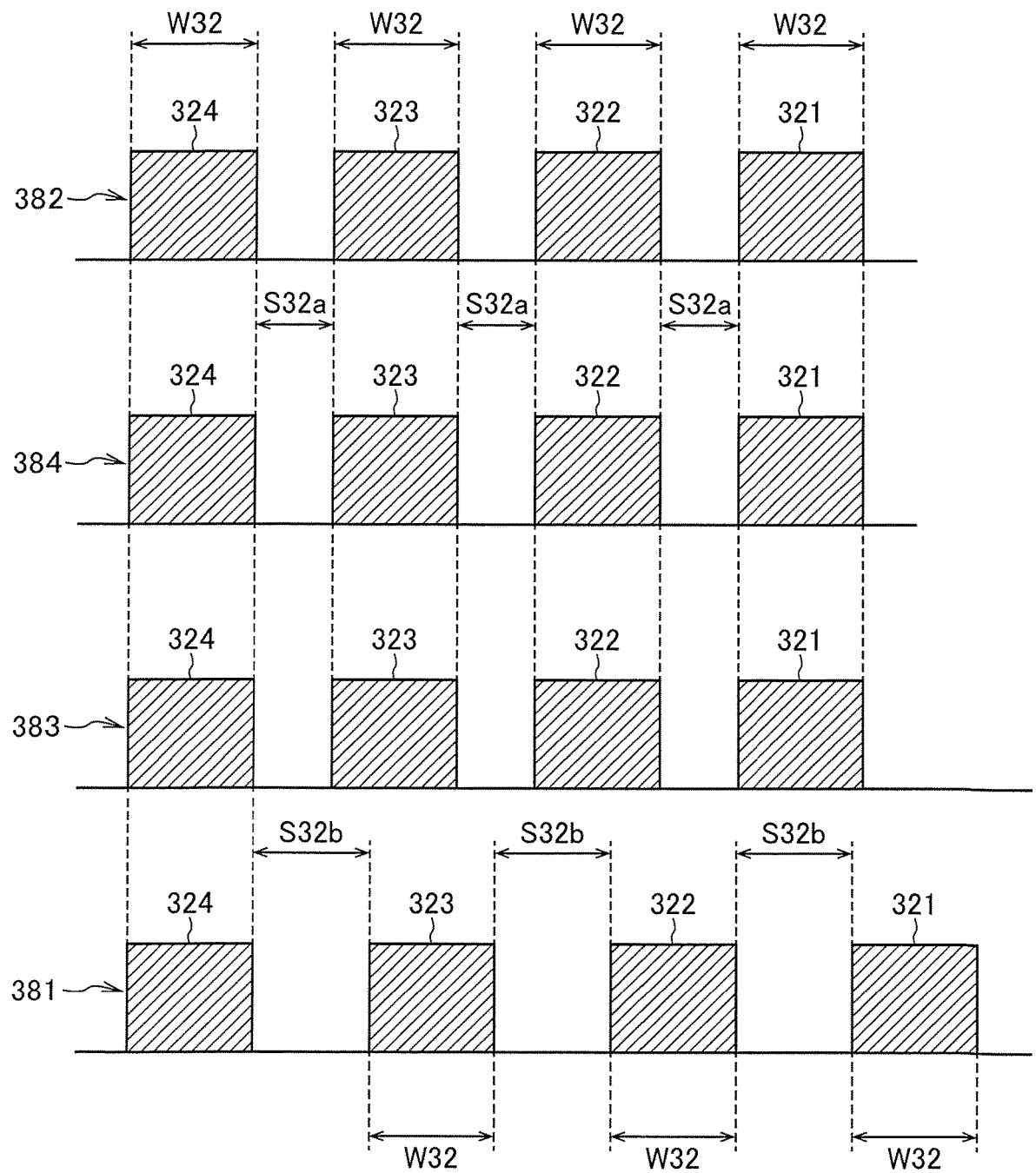

As illustrated in FIG. 18, the lines 321 to 324 constituting the turn 320 of the coil pattern 300 have the same line width W32. That is, the line width is not changed from line to line or depending on the planar position. The line widths W31 and W32 have a relationship of W31<W32. On the other hand, the space width in the turn 320 is S32a in the linear areas 382 to 384 and is S32b in the linear area 381, and the S32a and S32b have a relationship of S32b>S32a.

Figure 19:
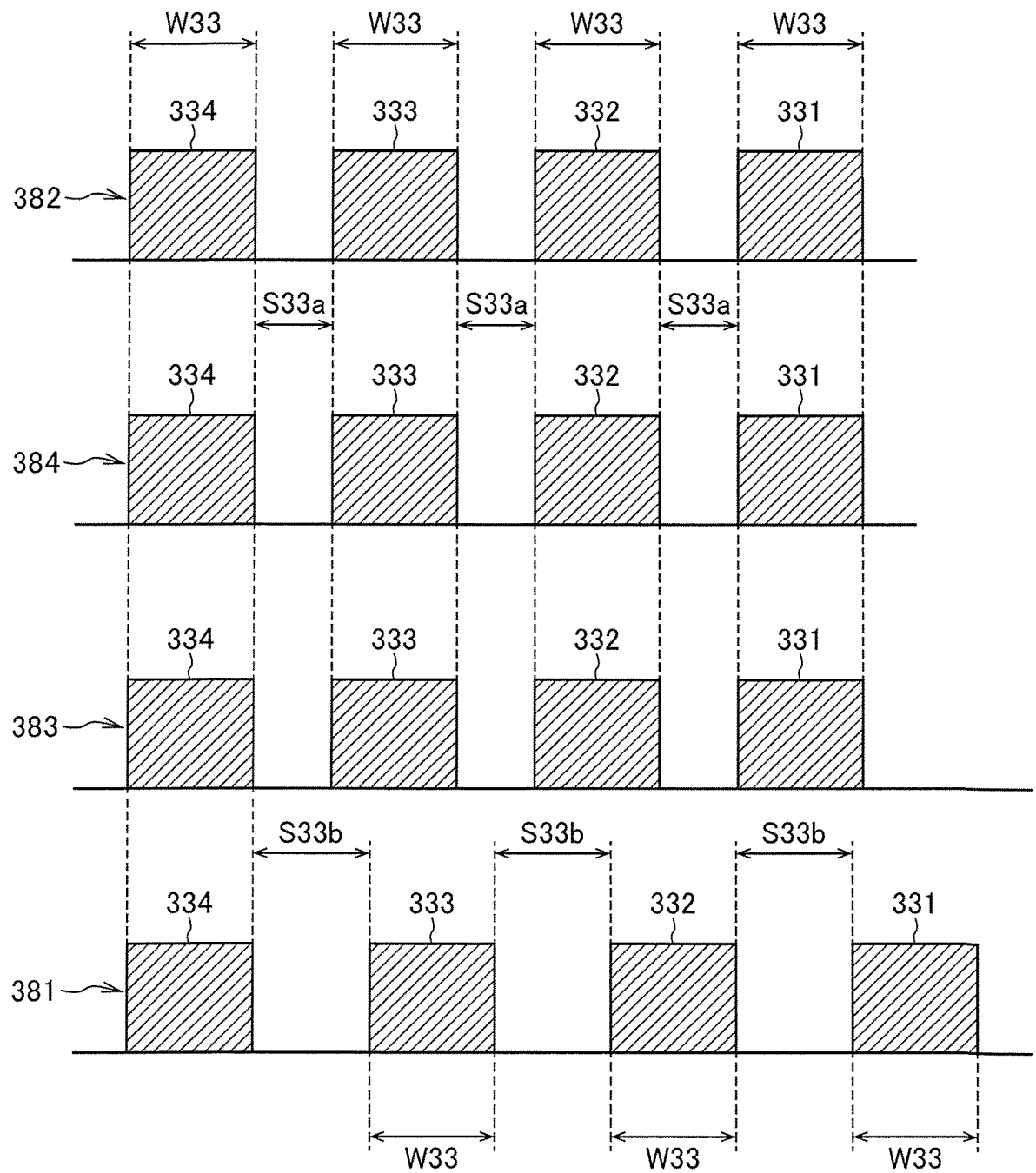

As illustrated in FIG. 19, the lines 331 to 334 constituting the turn 330 of the coil pattern 300 have the same line width W33. That is, the line width is not changed from line to line or depending on the planar position. The line widths W32 and W33 may have a relationship of W32=W33. On the other hand, the space width in the turn 330 is S33a in the linear areas 382 to 384 and is S33b in the linear area 381, and the S33a and S33b have a relationship of S33b>S33a.

Figure 20:
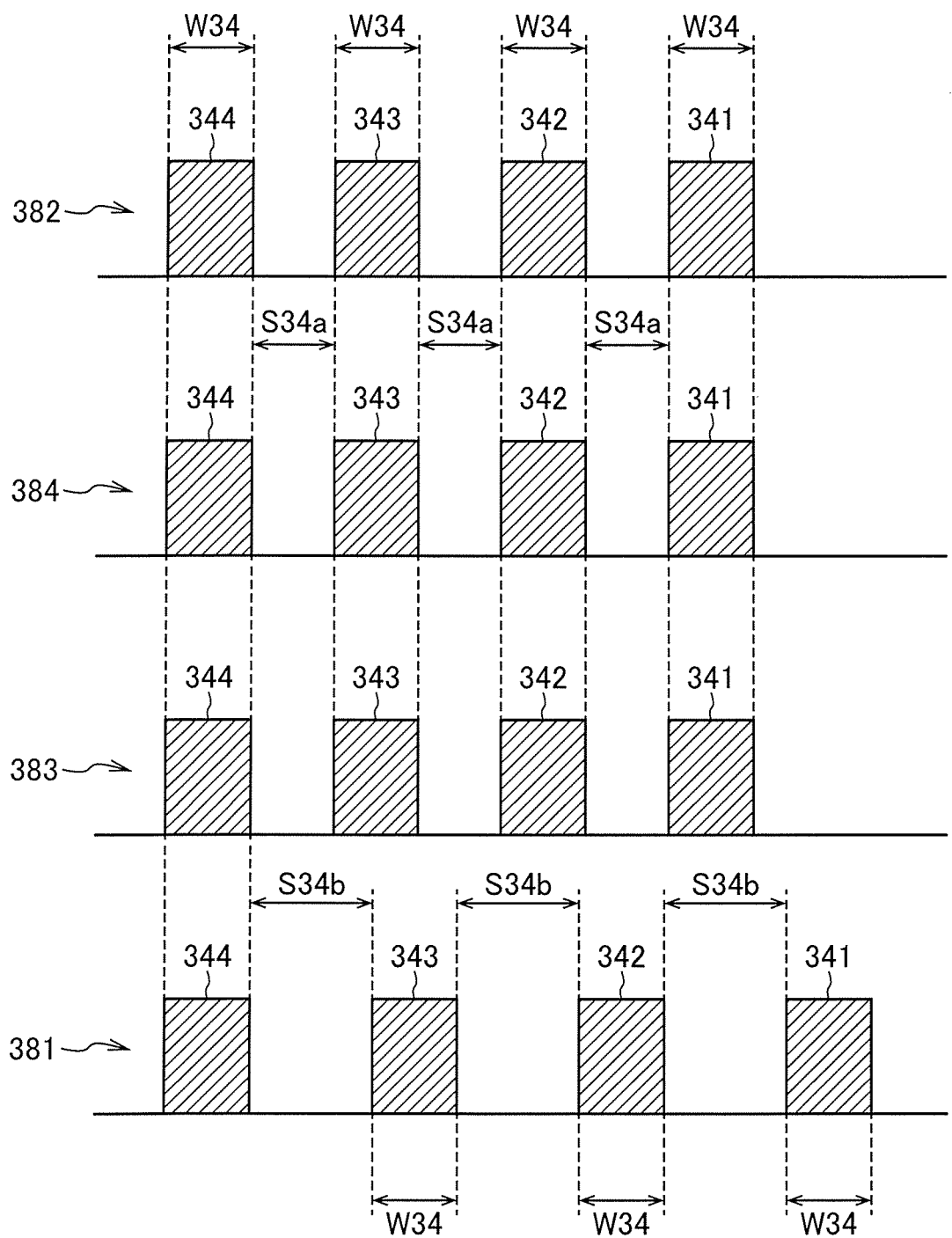

As illustrated in FIG. 20, the lines 341 to 344 constituting the turn 340 of the coil pattern 300 have the same line width W34. That is, the line width is not changed from line to line or depending on the planar position. The line widths W31 and W34 may have a relationship of W31=W34. On the other hand, the space width in the turn 340 is S34a in the linear areas 382 to 384 and is S34b in the linear area 381, and the S34a and S34b have a relationship of S34b>S34a.

Figure 21:
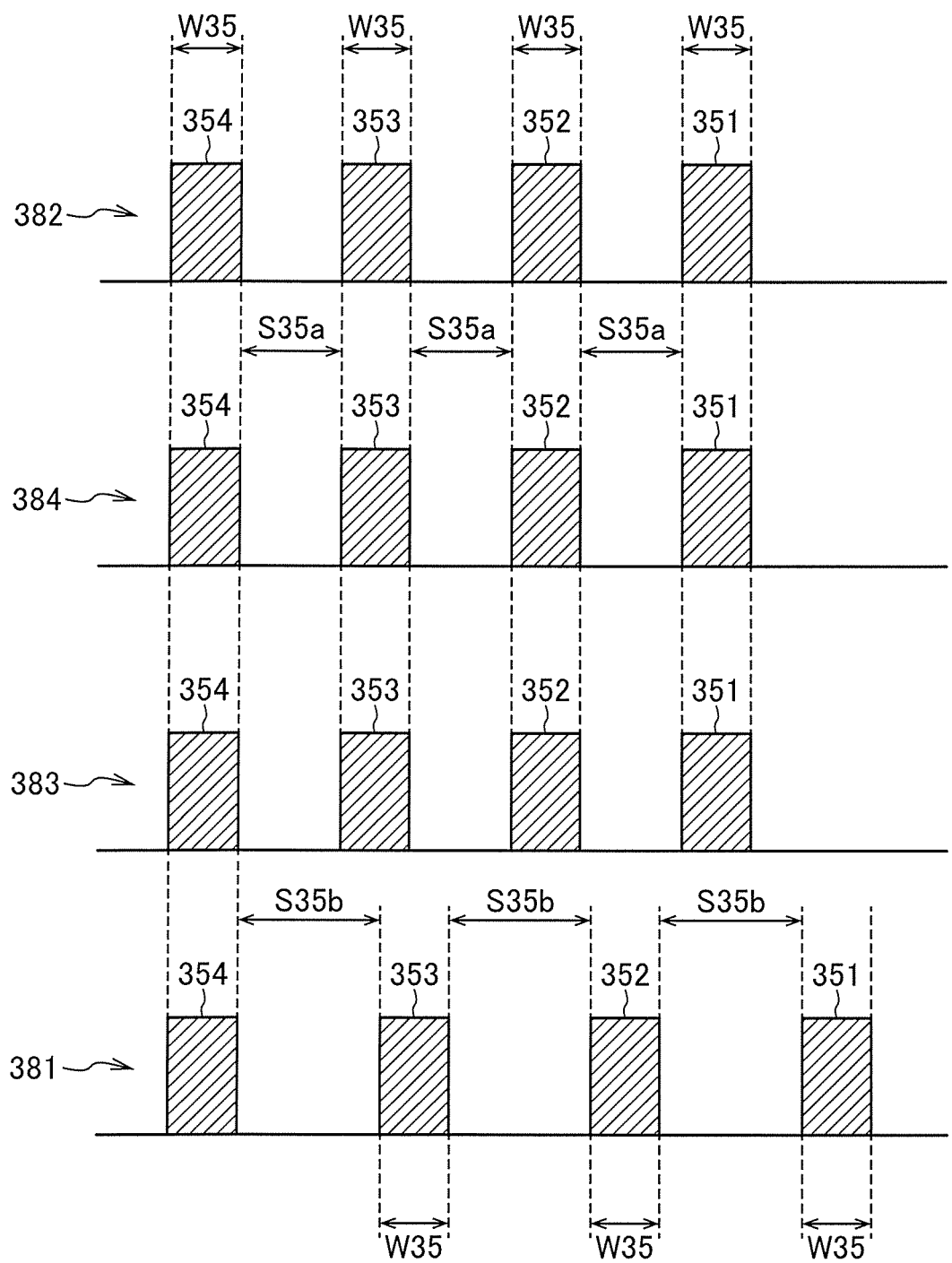

As illustrated in FIG. 21, the lines 351 to 354 constituting the turn 350 of the coil pattern 300 have the same line width W35. That is, the line width is not changed from line to line or depending on the planar position. The line widths W31 and W35 may have a relationship of W31=W35 or W31>W35. On the other hand, the space width in the turn 350 is S35a in the linear areas 382 to 384 and is S35b in the linear area 381, and the S35a and S35b have a relationship of S35b>S35a.

The relationship between the S31a to S35a and the relationship between the 31b to S35b may be: S31a=S32a S33a=S34a=S35a, and S31b=S32b=S33b=S34b=S35b.

As described above, in the coil pattern 300, the space width between the lines differs in the same turn depending on the planar position. Specifically, the space widths S31a to S35a are small in the linear areas 382 to 384, while the space widths S31b to S35b are large in the linear area 381. Thus, it is possible to enlarge the outer shape of the coil pattern 300 in the positive x-direction without enlarging the outer shape thereof in the y-direction and without significantly changing the shape and size of the inner diameter area 70. In other words, the inner diameter area 72 can be offset in the negative x-direction with respect to the outer shape of the coil pattern 300. As a result, when the thus configured first side coil C1 is used as a power transmitting coil of a wireless power transmission system, it is possible to alleviate a reduction in transmission efficiency which may occur in the vicinity of the boundary between the areas X0 and X1 illustrated in FIGS. 2 and 5.

Further, in the coil pattern 300, the width of lines in the same turn is constant, and the width of the same line changes between different turns. For example, it is designed such that W35<W31=W34<W32=W33. The resulting effect is as described above in connection with the coil pattern 100. The change of the line width is made in the curved areas 391 and 392. Further, in terms of the thickness of the conductor pattern constituting the coil pattern 300, the innermost turn 350 may be smaller than the outermost turn 310. The resulting effect in this case is also as described with reference to the coil pattern 100.

The coil pattern 400 has the same pattern shape and hence the same effects as the coil pattern 300 has. Further, the turns 310, 320, 330, 340, and 350 of the coil pattern 300 and the turns 410, 420, 430, 440, and 450 of the coil pattern 400 are each radially divided into four parts by the spiral slits, so that uneven distribution of current density is reduced, allowing a reduction in DC resistance or AC resistance. In addition, the outermost lines 311, 321, 331, 341, and 351 in each of the turns constituting the coil pattern 300 are connected, respectively, to the innermost lines 415, 425, 435, 445, and 455 of each of turns constituting the coil pattern 400, and the innermost lines 315, 325, 335, 345, and 355 in each of the turns constituting the coil pattern 300 are connected, respectively, to the outermost lines 411, 421, 431, 441, and 451 of each of turns constituting the coil pattern 400, so that a difference in the electrical length of line between inner and outer peripheries can be eliminated. This makes current density distribution more even, allowing a further reduction in DC resistance or AC resistance.

Referring back to FIG. 15, the coil pattern 500 is constituted by a planar conductor spirally wound in a plurality of turns. In the example of FIG. 15, the coil pattern 500 has a five-turn configuration including turns 510, 520, 530, 540, and 550. The turn 510 constitutes the outermost turn, and the turn 550 constitutes the innermost turn. The turns 510, 520, 530, 540, and 550 are each radially divided into four parts by three spiral slits. As a result, the turn 510 is divided into lines 511 to 514, the turn 520 is divided into lines 521 to 524, the turn 530 is divided into lines 531 to 534, the turn 540 is divided into lines 541 to 544, and the turn 550 is divided into lines 551 to 554. Thus, in terms of lines, the line 511 constitutes the outermost line, and the line 554 constitutes the innermost line.

The lines 511 to 514 of the outermost turn 510 are connected to a terminal electrode pattern 561 through a radially extending lead-out pattern 562. A radially extending lead-out pattern 572 is disposed peripherally adjacent to the lead-out pattern 562 and is connected, at its leading end, to a terminal electrode pattern 571. On the other hand, the inner peripheral ends of the respective lines 551 to 554 of the innermost turn 550 are connected, respectively, to through hole conductors T51 to T54 penetrating the insulating substrate (40, 50, 60).

The turns 510, 520, 530, 540, and 550 constituting the coil pattern 500 each have linear areas 582 and 584 extending in the x-direction, linear areas 581 and 583 extending in the y-direction, and curved areas 591 to 594 positioned between the two adjacent linear areas. The linear area 582 includes a transition area 582a as a boundary between the turns 510,

520, 530, 540, and 550, and hence the turns 510, 520, 530, 540, and 550 each obliquely extend by one turn in the y-direction.

The pattern shape of the coil pattern 500 is the same as that of the coil pattern 300 except that the inner diameter area 72 is offset in the positive x-direction. Further, the coil patterns 300 and 500 are arranged side by side in the x-direction. Thus, when virtual lines L51, L52, L53, and L54 are defined with a reference point CP5 positioned in the inner diameter area 72 as a starting point, the virtual lines L33 and L51 overlap each other.

When the coil pattern 500 is made to overlap the coil pattern 100, the virtual line L51 of the coil pattern 500 and the virtual line L13 of the coil pattern 100 partially coincide with each other in a plan view. As a result, the virtual line L51 passes the inner diameter area 70 of the coil pattern 100 in a plan view, and the virtual line L13 passes the inner diameter area 72 of the coil pattern 500 in a plan view.

As illustrated in FIG. 16, the coil pattern 600 has the same pattern shape as the coil pattern 300. Thus, the coil patterns 300 and 600 can be produced using the same mask, allowing a significant reduction in manufacturing cost.

As illustrated in FIG. 16, the coil pattern 600 has a five-turn configuration including turns 610, 620, 630, 640, and 650. The turn 610 constitutes the outermost turn, and the turn 650 constitutes the innermost turn. The turns 610, 620, 630, 640, and 650 are each radially divided into four parts by three spiral slits. As a result, the turn 610 is divided into lines 611 to 614, the turn 620 is divided into lines 621 to 624, the turn 630 is divided into lines 631 to 634, the turn 640 is divided into lines 641 to 644, and the turn 650 is divided into lines 651 to 654. Thus, in terms of lines, the line 611 constitutes the outermost line, and the line 654 constitutes the innermost line.

The lines 611 to 614 of the outermost turn 610 are connected to a terminal electrode pattern 661 through a radially extending lead-out pattern 662. A radially extending lead-out pattern 672 is disposed peripherally adjacent to the lead-out pattern 662 and is connected, at its leading end, to a terminal electrode pattern 671. The lead-out pattern 672 is connected to the lead-out pattern 562 illustrated in FIG. 15 through a plurality of through hole conductors T35. Similarly, the lead-out pattern 662 is connected to the lead-out pattern 572 illustrated in FIG. 15 through a plurality of through hole conductors T56. As a result, the terminal electrode pattern 561 and the terminal electrode 671 are short-circuited, and the terminal electrode pattern 571 and the terminal electrode 661 are short-circuited.

On the other hand, the inner peripheral ends of the respective lines 651 to 654 of the innermost turn 650 are connected, respectively, to through hole conductors T54 to T51. As a result, the inner peripheral ends of the respective lines 651 to 654 are connected, respectively, to the inner peripheral ends of the lines 554, 553, 552, and 551 of the coil pattern 500.

The turns 610, 620, 630, 640, and 650 constituting the coil pattern 600 each have linear areas 682 and 684 extending in the x-direction, linear areas 681 and 683 extending in the y-direction, and curved areas 691 to 694 positioned between the two adjacent linear areas. The linear area 682 includes a transition area 682a as a boundary between the turns 610, 620, 630, 640, and 650, and the turns 610, 620, 630, 640, and 650 each obliquely extend by one turn in the y-direction.

The pattern shape of the coil pattern 600 is the same as that of the coil pattern 400 except that the inner diameter area 72 is offset in the positive x-direction. Further, the coil patterns 400 and 600 are arranged side by side in the x-direction. Thus, when virtual lines L51, L52, L53, and L54 are defined with a reference point CP6 positioned in the inner diameter area 72 as a starting point, the virtual lines L33 and L51 overlap each other.

When the coil patterns 500 and 600 are made to overlap each other, the inner peripheral ends of the lines 551, 552, 553, and 554 of the coil pattern 500 are connected, respectively, to the inner peripheral ends of the lines 654, 653, 652, and 651 of the coil pattern 600 through the through hole conductors T51 to T54. As a result, the coil patterns 500 and 600 are connected in series to each other to constitute a spiral coil having 10 turns in total. The second side coil C2 has a configuration in which three coil units each constituted by the coil patterns 500 and 600 are connected in parallel, so that a current about three times that obtained when only one coil unit is used can be made to flow.

As described above, the pattern shapes of the coil patterns 500 and 600 are the same as those of the coil patterns 300 and 400, respectively, except that the inner diameter area 72 is offset in the positive x-direction. Thus, the coil patterns 500 and 600 can each provide effects same as those described above in connection with the coil patterns 300 and 400. Further, the inner diameter area 72 can be offset in the positive x-direction with respect to the outer shapes of the coil patterns 500 and 600, so that when the thus configured second side coil C2 is used as a power transmitting coil of a wireless power transmission system, it is possible to alleviate a reduction in transmission efficiency which may occur in the vicinity of the boundary between the areas X0 and X2 illustrated in FIGS. 2 and 5.

Figure 22:
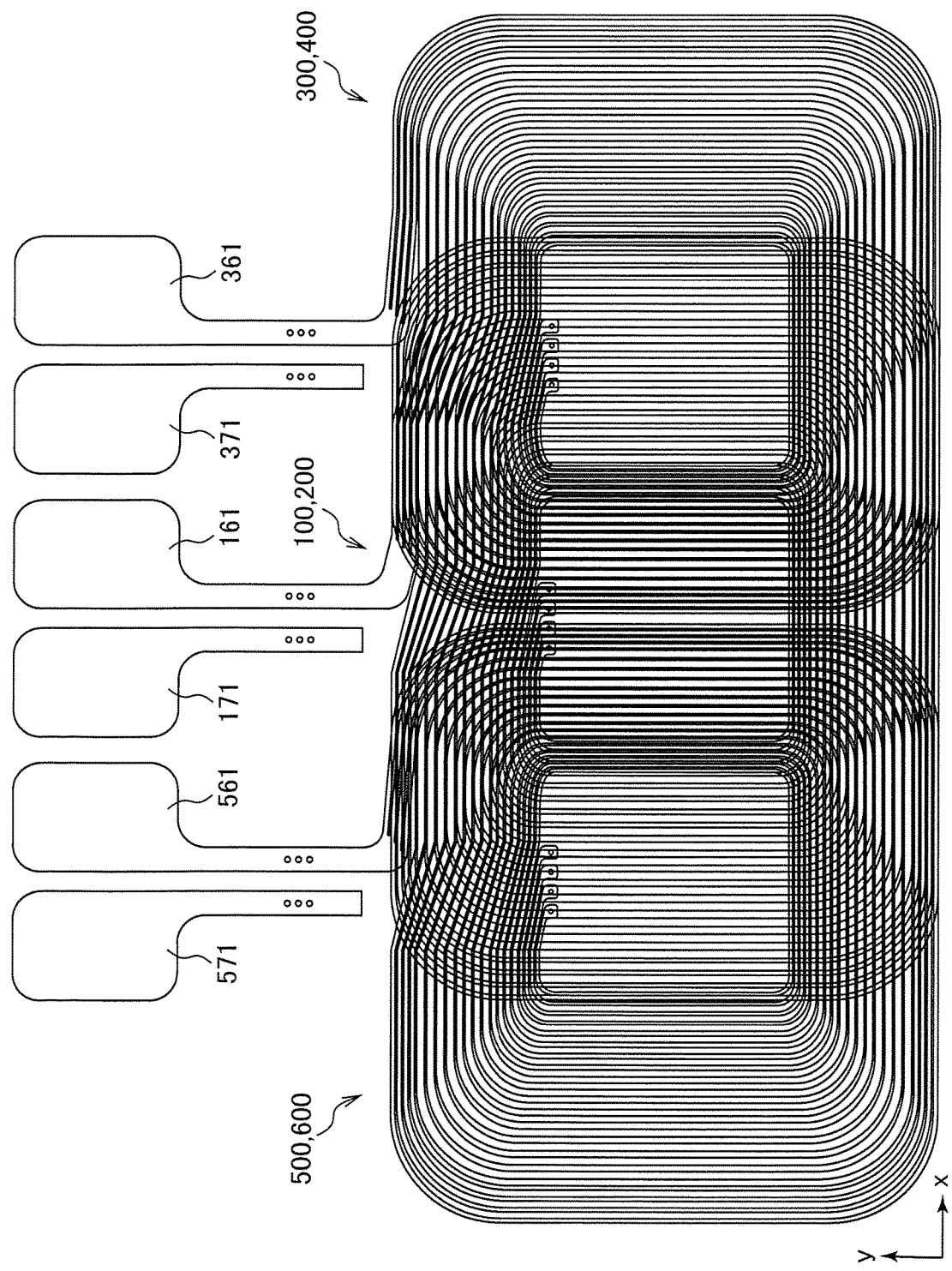
FIG. 22 is a schematic plan view illustrating a state where the coil patterns 100, 200, 300, 400, 500, and 600 overlap one another.

FIG. 22 is a schematic plan view illustrating a state where the coil patterns 100, 200, 300, 400, 500, and 600 overlap one another. As illustrated in FIG. 22, the overlapping mode between the coil patterns 100, 200, 300, 400, 500, and 600 is as described above using FIG. 2.

As described above, in the coil component 1 according to the present embodiment, the turns constituting each of the coil patterns 100, 200, 300, 400, 500, and 600 are each divided into four lines, and the space width between lines in the same turn differs depending on the planar position. Thus, when the thus configured coil component 1 is used as a power transmitting coil of a wireless power transmission system, the following effects can be obtained: in the coil patterns 100 and 200 constituting the center coil C0, a range capable of achieving efficient power transmission can be enlarged in both the positive and negative x-directions; in the coil patterns 300 and 400 constituting the first side coil C1, a range capable of achieving efficient power transmission can be enlarged in the negative x-direction; and in the coil patterns 500 and 600 constituting the first side coil C2, a range capable of achieving efficient power transmission can be enlarged in the positive x-direction. As a result, it is possible to alleviate a reduction in transmission efficiency which may occur in the vicinity of the boundary between the areas X0 and X1 illustrated in FIGS. 2 and 5 and in the vicinity of the boundary between the areas X0 and X2 illustrated in FIGS. 2 and 5.

Figure 23:
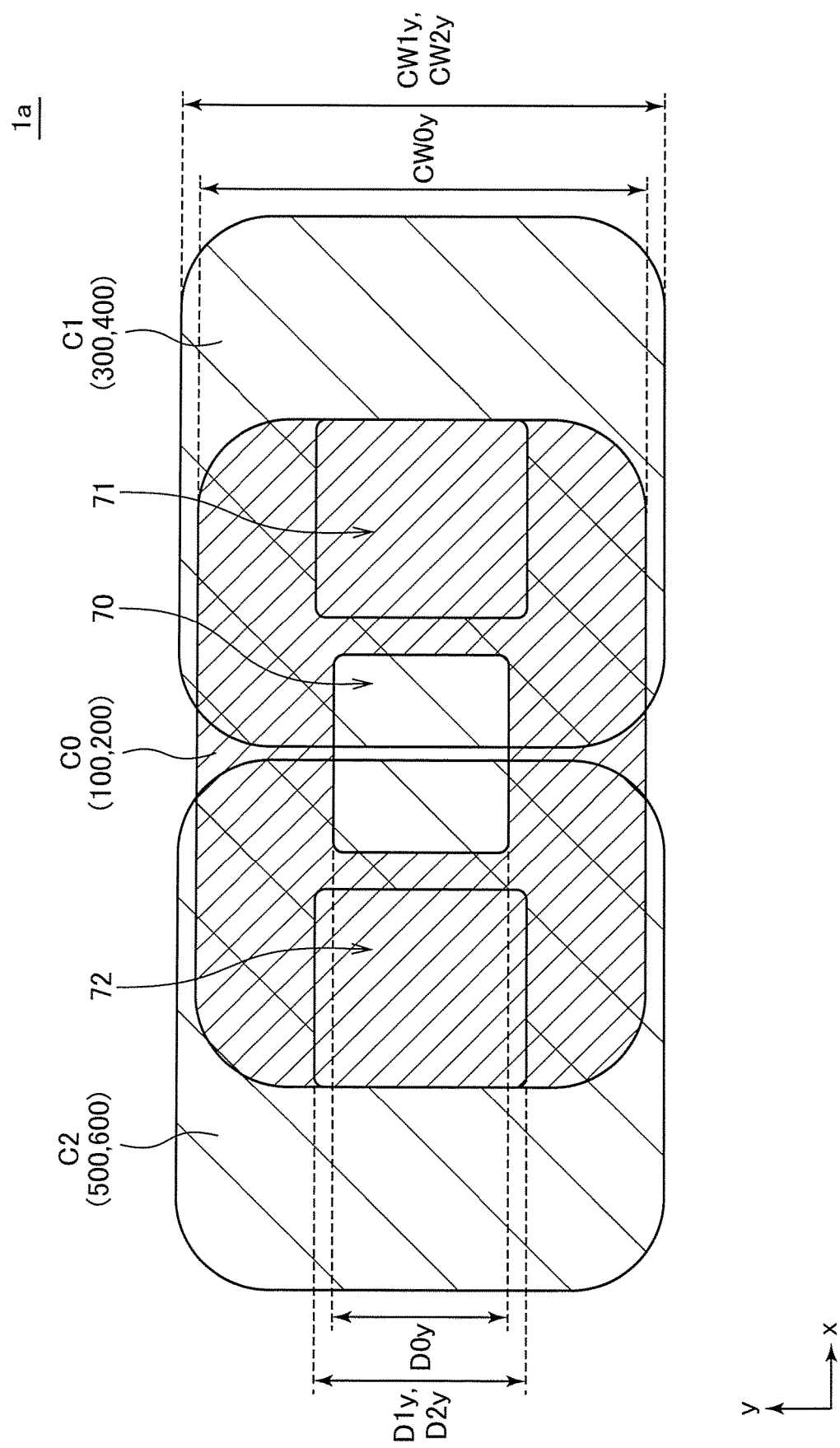
FIG. 23 is a plan view transparently illustrating a coil component according to a first modification.

FIG. 23 is a plan view transparently illustrating a coil component 1a according to the first modification.

The coil component 1a of FIG. 23 according to the first modification differs from the coil component 1 of the above embodiment in that y-direction sizes CW1y and CW2y of the first and second side coils C1 and C2 are larger than a y-direction size CW0y of the center coil C0 and that y-direction sizes D1y and D2y of the inner diameter areas 71 and 72 of the first and second side coils C1 and C2 are larger than a y-direction size D0y of the inner diameter area 70 of the center coil C0. As described above, the center coil C0 and the side coil (C1, C2) may differ from each other in the diameter thereof. So is the inner diameter area 70 and the inner diameter area (71, 72).

Figure 24:
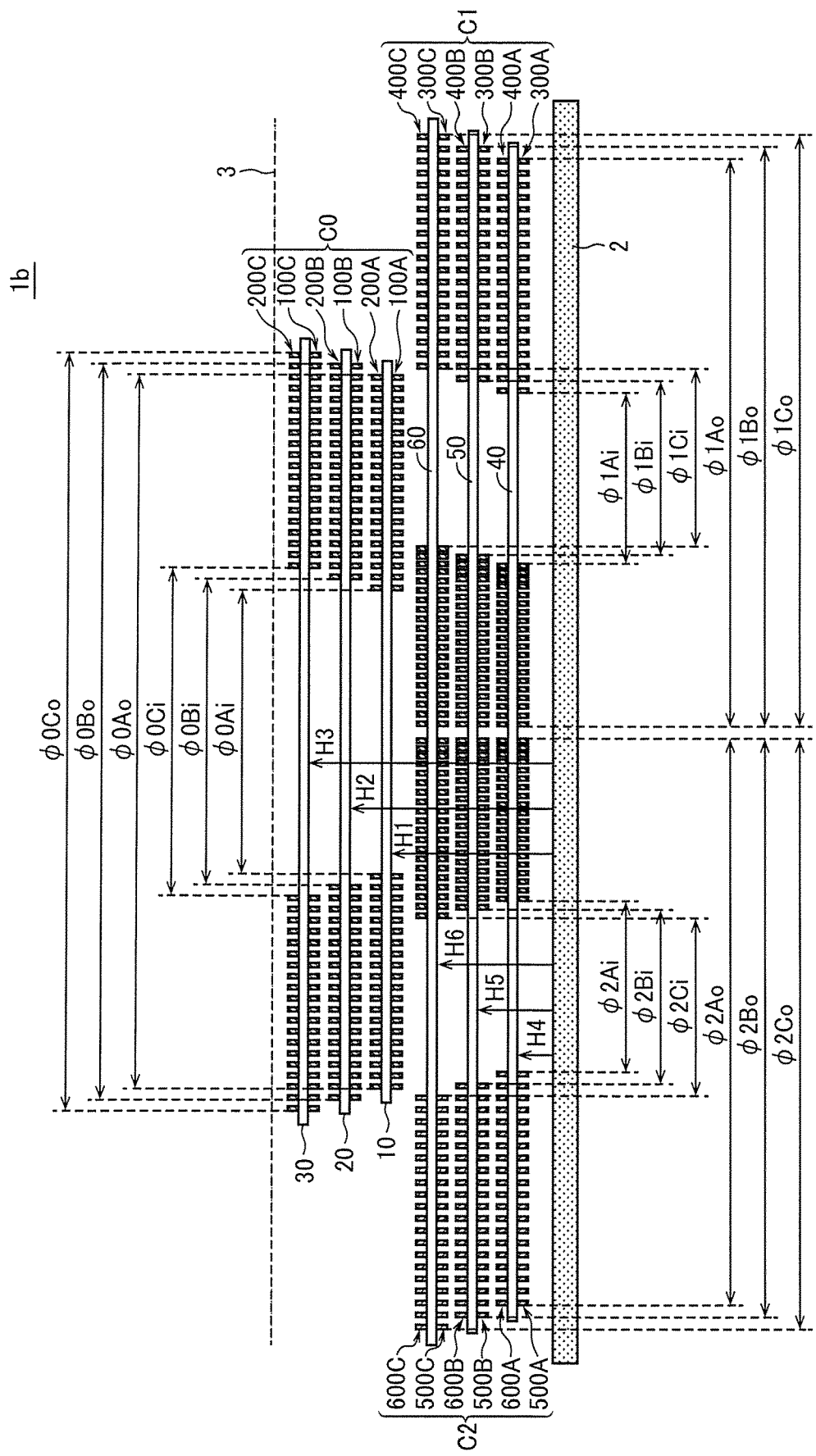
FIG. 24 is a schematic cross-sectional view for explaining the configuration of a coil component according to a second modification.

FIG. 24 is a schematic cross-sectional view for explaining the configuration of a coil component 1b according to the second modification.

As illustrated in FIG. 24, in the coil component 1b according to the second modification, of the coil patterns 100A, 200A, 100B, 200B, 100C, and 200C constituting the center coil C0, the coil patterns 100A and 200A are each assumed to have an inner diameter $\phi 0Ai$ and an outer diameter $\phi 0Ao$, the coil patterns 100B and 200B are each assumed to have an inner diameter $\phi 0Bi$ and an outer diameter $\phi 0Bo$, and the coil patterns 100C and 200C are each assumed to have an inner diameter $\phi 0Ci$ and an outer diameter $\phi 0Co$. In this case, both $\phi 0Ai<\phi 0Bi<\phi 0Ci$ and $\phi 0Ao<\phi 0Bo<\phi 0Co$ are satisfied. Here, assuming that the distances from the magnetic sheet 2 to the insulating substrates 10, 20, and 30 are H1, H2, and H3, respectively, H1<H2<H3 is satisfied. That is, the inner and outer diameters $\phi 0Ai$ and $\phi 0Ao$ of each of the coil patterns 100A and 200A positioned closest to the magnetic sheet 2 are smallest, and the inner and outer diameters $\phi 0Ci$ and $\phi 0Co$ of each of the coil patterns 100C and 200C positioned farthest from the magnetic sheet 2 are largest.

Since the coil patterns 100A, 200A, 100B, 200B, 100C, and 200C are the same in the number of turns, the line length of each of the coil patterns 100B and 200B formed on the insulating substrate 20 is longer than that of each of the coil patterns 100A and 200A formed on the insulating substrate 10, and the line length of each of the coil patterns 100C and 200C formed on the insulating substrate 30 is longer than that of each of the coil patterns 100B and 200B formed on the insulating substrate 20.

Further, of the coil patterns 300A, 400A, 300B, 400B, 300C, and 400C constituting the first side coil C1, the coil patterns 300A and 400A are each assumed to have an inner diameter $\phi 1Ai$ and an outer diameter $\phi 1Ao$, the coil patterns 300B and 400B are each assumed to have an inner diameter $\phi 1Bi$ and an outer diameter $\phi 1Bo$, and the coil patterns 300C and 400C are each assumed to have an inner diameter $\phi 1Ci$ and an outer diameter $\phi 1Co$. In this case, both $\phi 1Ai<\phi 1Bi<\phi 1Ci$ and $\phi 1Ao<\phi 1Bo<\phi 1Co$ are satisfied. Here, assuming that the distances from the magnetic sheet 2 to the insulating substrates 40, 50, and 60 are H4, H5, and H6, respectively, H4<H5<H6 is satisfied. That is, the inner and outer diameters $\phi 1Ai$ and $\phi 1Ao$ of each of the coil patterns 300A and 400A positioned closest to the magnetic sheet 2 are smallest, and the inner and outer diameters $\phi 1Ci$ and $\phi 1Co$ of each of the coil patterns 300C and 400C positioned farthest from the magnetic sheet 2 are largest.

Since the coil patterns 300A, 400A, 300B, 400B, 300C, and 400C are the same in the number of turns, the line length of each of the coil patterns 300B and 400B formed on the insulating substrate 50 is longer than that of each of the coil patterns 300A and 400A formed on the insulating substrate 40, and the line length of each of the coil patterns 300C and 400C formed on the insulating substrate 60 is longer than that of each of the coil patterns 300B and 400B formed on the insulating substrate 50.

Similarly, of the coil patterns 500A, 600A, 500B, 600B, 500C, and 600C constituting the second side coil C2, the coil patterns 500A and 600A are each assumed to have an inner diameter $\phi 2Ai$ and an outer diameter $\phi 2Ao$, the coil patterns 500B and 600B are each assumed to have an inner diameter $\phi 2Bi$ and an outer diameter $\phi 2Bo$, and the coil patterns 500C and 600C are each assumed to have an inner diameter $\phi 2Ci$ and an outer diameter $\phi 2Co$. In this case, both $\phi 2Ai<\phi 2Bi<\phi 2Ci$ and $\phi 2Ao<\phi 2Bo<\phi 2Co$ are satisfied. That is, the inner and outer diameters $\phi 2Ai$ and $\phi 2Ao$ of each of the coil patterns 500A and 600A positioned closest to the magnetic sheet 2 are smallest, and the inner and outer diameters $\phi 2Ci$ and $\phi 2Co$ of each of the coil patterns 500C and 600C positioned farthest from the magnetic sheet 2 are largest.

Since the coil patterns 500A, 600A, 500B, 600B, 500C, and 600C are the same in the number of turns, the line length of each of the coil patterns 500B and 600B formed on the insulating substrate 50 is longer than that of each of the coil patterns 500A and 600A formed on the insulating substrate 40, and the line length of each of the coil patterns 500C and 600C formed on the insulating substrate 60 is longer than that of each of the coil patterns 500B and 600B formed on the insulating substrate 50.

As described above, in the coil component 1b according to the second modification, the line length of each coil pattern changes depending on the distance from the magnetic sheet 2. When the magnetic sheet 2 exists, a difference may occur in impedance between the coil patterns due to a difference in inductance according to the distance from the magnetic sheet 2 even when the coil patterns are the same in the number of turns. When a difference in impedance exists between the coil patterns, a large loss may be caused due to uneven distribution of current density caused by the impedance difference. As a result, when such a coil component is used as a power transmitting coil of a wireless power transmission system, heat generation associated with power transmission may become large.

Considering this, in the coil component 1b according to the second modification, the line lengths of the coil patterns 100A, 200A, 300A, 400A, 500A, and 600A which are positioned closest to the magnetic sheet 2 and thus have the highest impedance are made shorter than the line lengths of the coil patterns 100B, 200B, 300B, 400B, 500B, and 600B to thereby reduce the inductance thereof, and the line lengths of the coil patterns 100C, 200C, 300C, 400C, 500C, and 600C which are positioned farthest from the magnetic sheet 2 and thus have the lowest impedance are made longer than the line lengths of the coil patterns 100B, 200B, 300B, 400B, 500B, and 600B to thereby increase the inductance thereof. As a result, the inductance difference between the coil patterns is reduced, whereby uneven distribution of current density caused by the impedance difference is reduced, or ideally eliminated. Thus, when the coil component 1b according to the second modification is used as a power transmitting coil of a wireless power transmission system, it is possible to reduce a loss of the entire wireless power transmitting device TX.

Figure 25:
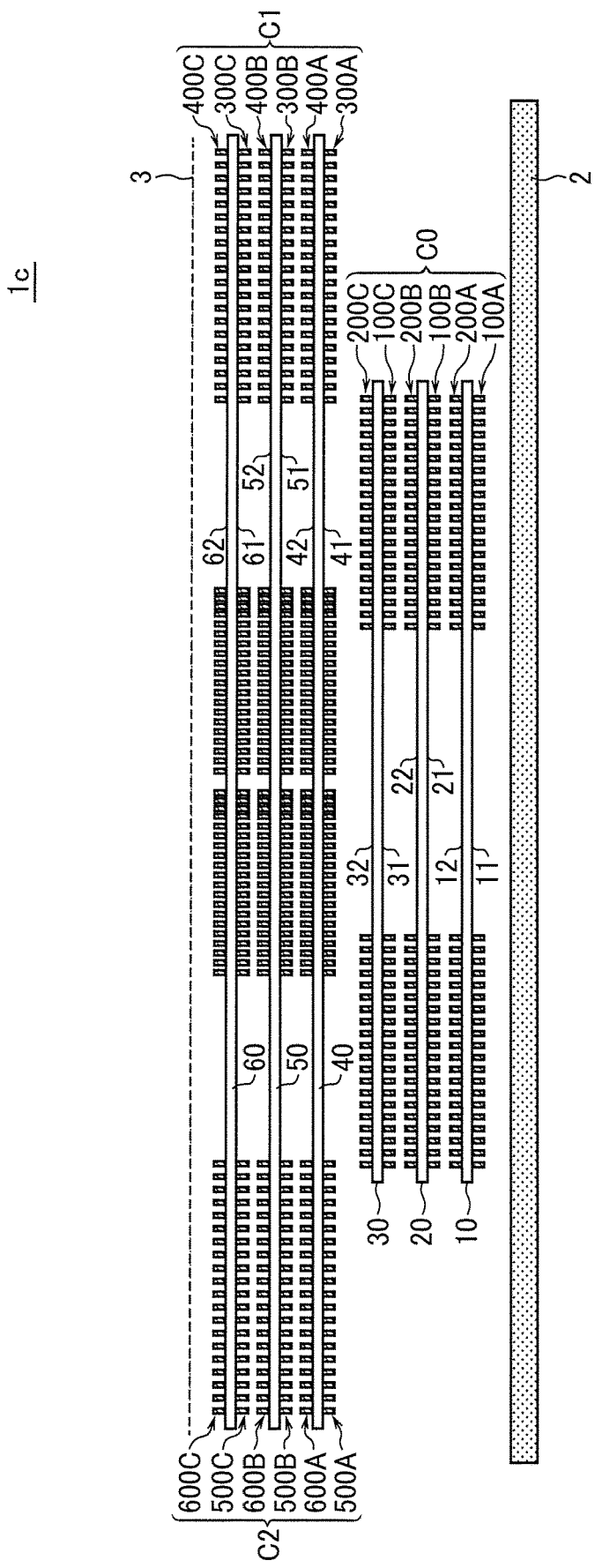
FIG. 25 is a schematic cross-sectional view for explaining the configuration of a coil component according to a third modification.

FIG. 25 is a schematic cross-sectional view for explaining the configuration of a coil component 1c according to the third modification.

As illustrated in FIG. 25, in the coil component is according to the third modification, the center coil C0 is positioned at the magnetic sheet 2 side, and the first and second side coils C1 and C2 are positioned at the power receiving surface 3 side. Thus, the lamination order of the center coil C0 and first and second side coils is not particularly limited.

It is apparent that the present invention is not limited to the above embodiments, but may be modified and changed without departing from the scope and spirit of the invention.

For example, although the coil component 1 according to the present embodiment includes one center coil C0 and two side coils C1 and C2, this is not essential in the present invention. Thus, the coil component 1 may include only the center coil C0, or may have only the side coil C1 or side coil C2. Further, the coil component 1 may include only one center coil C0 and one side coil C1, or may include only two side coils C1 and C2. Further, it is not essential that the side coils C1 and C2 do not overlap each other in a plan view, but they may partially overlap each other in a plan view.

Further, the number of the coil patterns constituting the center coil C0 or each of the side coils C1 and C2 and the number of turns of each coil pattern are also not particularly limited. Further, although two coil patterns (e.g., coil patterns 100A and 200A) are formed on the front and back surfaces of the insulating substrate in the above embodiment, this is also not essential in the present invention.

Further, although all the turns constituting the coil pattern are each divided into four lines by the spiral slits in the above embodiment, this is not essential in the present invention, but it is sufficient that at least one turn is divided into a plurality of lines. Further, the number of divisions of each turn is not limited to four.

What is claimed is:

1. A coil component comprising a first coil pattern wound in a first planar spiral shape,
   wherein at least one turn constituting the first coil pattern is divided into a first plurality of lines by a first spiral slit,
   wherein a space width along a first virtual line and a space width along a second virtual line differ from each other, where the first virtual line extends in a first direction with a first reference point positioned in an inner diameter area of the first coil pattern as a first starting point, and where the second virtual line extends in a second direction substantially perpendicular to the first direction with the first reference point as a second starting point, and
   wherein $CW0x > CW0y$ and $CW0x/CW0y > D0x/D0y$ are satisfied, where an outer size of the first coil pattern in the first direction is $CW0x$, where an outer size of the first coil pattern in the second direction is $CW0y$, where a size of the inner diameter area of the first coil pattern in the first direction is $D0x$, and where a size of the inner diameter area of the first coil pattern in the second direction is $D0y$.

2. The coil component as claimed in claim 1, wherein a space width along the first virtual line and a third virtual line are larger than a space width along the second virtual line and a fourth virtual line, where the third virtual line extends in a direction 180° opposite to the first direction with the first reference point as a third starting point, and where the fourth virtual line extends in a direction 180° opposite to the second direction with the first reference point as a fourth starting point.

3. The coil component as claimed in claim 2, further comprising:
   a second coil pattern wound in a second planar spiral shape; and
   a first insulating substrate having first and second surfaces opposite to each other,
   wherein the first coil pattern is formed on the first surface of the first insulating substrate,
   wherein the second coil pattern is formed on the second surface of the first insulating substrate,
   wherein an innermost turn of the first coil pattern is divided by the first spiral slit into the first plurality of lines including first and second lines,
   wherein an innermost turn of the second coil pattern is divided by a second spiral slit into a second plurality of lines including third and fourth lines,
   wherein the first line is positioned on an inner peripheral side with respect to the second line,
   wherein the third line is positioned on an inner peripheral side with respect to the fourth line,
   wherein inner peripheral ends of the first and fourth lines are connected to each other through a first through hole conductor penetrating the first insulating substrate, and
   wherein inner peripheral ends of the second and third lines are connected to each other through a second through hole conductor penetrating the first insulating substrate.

4. The coil component as claimed in claim 1, wherein a space width along the first virtual line is larger than a space width along the second virtual line and a third virtual line, where the third virtual line extends in a direction 180° opposite to the first direction with the first reference point as a third starting point.

5. The coil component as claimed in claim 1, further comprising:
   a sixth coil pattern wound in a sixth planar spiral shape; and
   a magnetic sheet,
   wherein the first and sixth coil patterns are disposed so as to overlap the magnetic sheet in a plan view,
   wherein the first and sixth coil patterns are connected in parallel,
   wherein the first coil pattern is disposed closer to the magnetic sheet than the sixth coil pattern, and
   wherein a length of a wire forming the sixth coil pattern is longer than a length of a wire forming the first coil pattern.

6. A coil component comprising first and third coil patterns wound in first and third planar spiral shapes, respectively,
   wherein at least one turn constituting the first coil pattern is divided into a first plurality of lines by a first spiral slit,
   wherein a space width between the first plurality of lines differs depending on a planar position,
   wherein a space width along a first virtual line and a space width along a second virtual line differ from each other, where the first virtual line extends in a first direction with a first reference point positioned in an inner diameter area of the first coil pattern as a first starting point, and where the second virtual line extends in a second direction substantially perpendicular to the first direction with the first reference point as a second starting point,
   wherein a space width along the first virtual line and a third virtual line are larger than a space width along the second virtual line and a fourth virtual line, where the third virtual line extends in a direction 180° opposite to the first direction with the first reference point as a third starting point, and where the fourth virtual line extends in a direction 180° opposite to the second direction with the first reference point as a fourth starting point,
   wherein at least one turn constituting the third coil pattern is divided into a third plurality of lines by a third spiral slit,
   wherein a space width along a fifth virtual line is larger than a space width along a sixth virtual line, where the fifth virtual line extends in the first direction with a second reference point positioned in an inner diameter area of the third coil pattern as a fifth starting point, and where the sixth virtual line extends in the direction 180° opposite to the first direction with the second reference point as a sixth starting point, and wherein the first and third coil patterns overlap each other such that the sixth virtual line passes the inner diameter area of the first coil pattern in a plan view.

7. The coil component as claimed in claim 6, further comprising a switch that exclusively supply current to one of the first and third coil patterns.

8. The coil component as claimed in claim 6, further comprising:
a fourth coil pattern wound in a fourth planar spiral shape; and
a second insulating substrate having first and second surfaces opposite to each other,
wherein the third coil pattern is formed on the first surface of the second insulating substrate,
wherein the fourth coil pattern is formed on the second surface of the second insulating substrate,
wherein an innermost turn of the third coil pattern is divided by the third spiral slit into a third plurality of lines including fifth and sixth lines,
wherein an innermost turn of the fourth coil pattern is divided by a fourth spiral slit into a fourth plurality of lines including seventh and eighth lines,
wherein the fifth line is positioned on an inner peripheral side with respect to the sixth line,
wherein the seventh line is positioned on an inner peripheral side with respect to the eighth line,
wherein inner peripheral ends of the fifth and eighth lines are connected to each other through a third through hole conductor penetrating the second insulating substrate, and
wherein inner peripheral ends of the sixth and seventh lines are connected to each other through a fourth through hole conductor penetrating the second insulating substrate.

9. The coil component as claimed in claim 6, further comprising a fifth coil pattern wound in a fifth planar spiral shape,
wherein at least one turn constituting the fifth coil pattern is divided into a fifth plurality of lines by a fifth spiral slit,
wherein a space width along an eighth virtual line is larger than a space width along a seventh virtual line, where the seventh virtual line extends in the first direction with a third reference point positioned in an inner diameter area of the fifth coil pattern as a seventh starting point, and where the eighth virtual line extends in a direction 180° opposite to the first direction with the third reference point as an eighth starting point, and
wherein the first and fifth coil patterns overlap each other such that the seventh virtual line passes the inner diameter area of the first coil pattern in a plan view.

10. The coil component as claimed in claim 9, wherein the third and fifth coil patterns are formed on a same insulating substrate.

11. A coil component comprising first and second coil patterns wound in first and second planar spiral shapes, respectively,
wherein at least one turn constituting the first coil pattern is divided into a first plurality of lines by a first spiral slit,
wherein a space width between the first plurality of lines differs depending on a planar position,
wherein a space width along a first virtual line and a space width along a second virtual line differ from each other, where the first virtual line extends in a first direction with a first reference point positioned in an inner diameter area of the first coil pattern as a first starting point, and where the second virtual line extends in a second direction substantially perpendicular to the first direction with the first reference point as a second starting point, wherein a space width along the first virtual line is larger than a space width along the second virtual line and a third virtual line, where the third virtual line extends in a direction 180° opposite to the first direction with the first reference point as a third starting point, wherein at least one turn constituting the second coil pattern is divided into a second plurality of lines by a second spiral slit, wherein a space width along a fifth virtual line is larger than a space width along a fourth virtual line, where the fourth virtual line extends in the first direction with a second reference point positioned in an inner diameter area of the second coil pattern as a fourth starting point, and where the fifth virtual line extends in the direction 180° opposite to the first direction with the second reference point as a fifth starting point, and wherein the first and second coil patterns are disposed such that the third and fourth virtual lines overlap each other.

12. The coil component as claimed in claim 1,
wherein the first coil pattern has an innermost turn positioned on an innermost peripheral side, an outermost turn positioned on an outermost peripheral side, and an intermediate turn whose turn number counting from the innermost or outermost turn is at a center of a total number of turns,
wherein each of the innermost turn, outermost turn, and intermediate turn is divided by the first spiral slit into the first plurality of lines, and
wherein a line width of each of the first plurality of lines constituting each of the inner and outermost turns is smaller than a line width of each of the first plurality of lines constituting the intermediate turn.

13. The coil component as claimed in claim 12, wherein the line width of each of the first plurality of lines constituting the innermost turn is smaller than the line width of each of the first plurality of lines constituting the outermost turn.

14. A coil component comprising a planar coil pattern having a plurality of turns including a first turn,
wherein the first turn is divided into a first plurality of lines including first and second lines, and
wherein a first space between the first and second lines in a first section of the first turn is larger than a second space between the first and second lines in a second section of the first turn,
wherein a third space between the first and second lines in a third section of the first turn is larger than the second space,
wherein the first section extends in a first direction,
wherein the second section extends in a second direction substantially perpendicular to the first direction,
wherein the third section extends in in a direction 180° opposite to the first direction, and
wherein $CW0x/CW0y > D0x/D0y$ is satisfied, where an outer size of the coil pattern in the second direction is $CW0x$, where an outer size of the coil pattern in the first direction is $CW0y$, where a size of an inner diameter area of the coil pattern in the second direction is $D0x$, and where a size of the inner diameter area of the coil pattern in the first direction is $D0y$.

15. The coil component as claimed in claim 14,
wherein the plurality of turns further include a second turn,
wherein the second turn is divided into a second plurality of lines including third and fourth lines, and
wherein the third and fourth lines are greater in line width than the first and second lines.

16. The coil component as claimed in claim 15,
wherein the first turn is an innermost turn of the plurality of turns, and
wherein the second turn is an outermost turn of the plurality of turns.

\* \* \* \* \*